US006476976B2

(12) United States Patent
Kedar et al.

(10) Patent No.: US 6,476,976 B2
(45) Date of Patent: Nov. 5, 2002

(54) DOUBLY TELECENTRIC LENS AND IMAGING SYSTEM FOR MULTIWELL PLATES

(75) Inventors: Haim Kedar, Palo Alto; Edward Perry Wallerstein, Pleasanton; Albert William Brown, Jr., San Jose, all of CA (US)

(73) Assignee: Affymax Research Institute, Palo Alto, CA (US)

( * ) Notice: Subject to any disclaimer, the term of this patent is extended or adjusted under 35 U.S.C. 154(b) by 0 days.

(21) Appl. No.: 09/902,854

(22) Filed: Jul. 10, 2001

(65) Prior Publication Data

US 2002/0003669 A1 Jan. 10, 2002

Related U.S. Application Data

(60) Continuation of application No. 09/407,425, filed on Sep. 29, 1999, now Pat. No. 6,271,972, which is a division of application No. 09/038,723, filed on Mar. 10, 1998, now Pat. No. 6,198,577.

(51) Int. Cl.[7] .............................. G02B 13/22; G02B 9/00
(52) U.S. Cl. ....................................... 359/663; 359/754
(58) Field of Search ......................... 359/663, 754–757, 359/759, 649, 756–657, 676, 679, 691; 250/370

(56) References Cited

U.S. PATENT DOCUMENTS

| | | | | |
|---|---|---|---|---|
| 3,773,404 A | | 11/1973 | Moore ......................... | 359/785 |
| 4,382,074 A | | 5/1983 | Hart ............................ | 436/537 |
| 4,770,477 A | * | 9/1988 | Shafer ......................... | 359/355 |
| 4,892,409 A | | 1/1990 | Smith .......................... | 356/414 |
| 4,929,066 A | | 5/1990 | Wakimoto et al. .......... | 359/663 |
| 5,024,530 A | | 6/1991 | Mende ........................ | 356/402 |
| 5,087,987 A | | 2/1992 | Simbal ........................ | 359/663 |
| 5,200,861 A | | 4/1993 | Moskovich ................. | 359/662 |
| 5,461,228 A | | 10/1995 | Kirkman et al. ............. | 250/223 |
| 5,625,495 A | | 4/1997 | Moskovich ................. | 359/663 |
| 5,696,631 A | * | 12/1997 | Hoffman ..................... | 359/649 |
| 5,708,532 A | * | 1/1998 | Wartmann .................. | 359/663 |

FOREIGN PATENT DOCUMENTS

| | | | | |
|---|---|---|---|---|
| WO | WO 98/07022 | 2/1998 | .......... | G01N/21/64 |
| WO | WO 99/08233 | 2/1999 | ............. | G06T/7/00 |

OTHER PUBLICATIONS

"Ultra–Low Light Imaging The Tundra™ System", Product literature © 1997 Imaging Research, Inc. pp. 1–12.
"Imaging Systems in Assay Screening", (1997), Imaging Research, Inc. Brock University, Ontario, Canada.
"Tundra™ Assay Imaging System, Array Vision™ Genomics Imaging System", product description, (1997), Imaging Research, Inc., Brock University, Ontario, Canada.
K. Koller, et al., "A Generic Method for the Production of Cell Lines Expressing High Levels of 7–Transmembrane Receptors", Analytical Biochemistry 250, 51–60 Z(1997).
"The Tessar, Heliar and Other Compounded Triplets", Modern Lens Design, Smith (ed.), McGraw Hill, 197–219, (1992).

* cited by examiner

Primary Examiner—Jordan M. Schwartz
(74) Attorney, Agent, or Firm—Bingham, McCutchen, LLP; David G. Beck

(57) ABSTRACT

A multiple element color-corrected doubly telecentric lens and imaging system useful for imaging multiwell plates is described. The lens contains a biconvex field lens element L1, a positive meniscus lens element L2, concave toward the incident light side, a double-Gauss lens element group, a positive meniscus lens element L10, convex toward the incident light, a positive meniscus lens element L11, convex toward the incident light, and a plano concave field flattener lens element L12, concave toward the incident light side. The lens is very sensitive, and can be used to image scintillation proximity assays in multiwell plates.

11 Claims, 12 Drawing Sheets

DOUBLY TELECENTRIC LENS AND IMAGING SYSTEM FOR MULTIWELL PLATES

This application is a continuation of application Ser. No. 09/407,425 filed Sep. 29, 1999 now U.S. Pat. No. 6,271,972 which is a division of application Ser. No. 09/038,723 filed Mar. 10, 1998 now U.S. Pat. No. 6,198,577.

FIELD OF THE INVENTION

The present invention relates to the imaging of multiwell plates, in particular, to the use of a doubly telecentric lens and system for accurate and efficient detection of low levels of light from high density multiwell plates.

BACKGROUND OF THE INVENTION

Microtiter or multi-well plates are becoming increasingly popular in various chemical and biological assays. Further, high-density format plates, such as 384, 864 and 1536 well plates, are beginning to displace 96-well plates as the plate of choice. Many of the assays conducted in multiwell plates employ some type of light detection from the plate as the reporter for positive or negative assays results. Such assays include fluorescence assays, luminescence assays (e.g., luciferase-based assays), phosphorescence assays, scintillation assays, and the like. In particular, with the advent of solid phase scintillating materials, capsules and beads, homogeneous scintillation proximity assays (SPA)-are now being performed with increasing frequency in multiwell plates.

Detection of light signals from multiwell plates in the past has typically been done using plate readers, which generally employ a photodetector, an array of such photodetectors, photomultiplier tubes or a photodiode array to quantify the amount of light emitted from different wells. Such plate readers have been disclosed, for example, by Russell, et al., U.S. Pat. No. 4,810,096, issued Mar. 7, 1989, and VanCauter, et al., U.S. Pat. No. 5,198,670, issued Mar. 30, 1993. Although plate readers can detect the total light from each well, they have a number of limitations. For example, plate readers are typically not capable of resolving discrete light sources in a single well, so they could not be used, for example, to differentiate light from different beads in one well. Further, most plate readers have fewer photodetectors than there are wells in the plate, so at least some wells must be read serially, adding to the time required to complete the assays. This becomes a substantial problem in assays where the light signal is so low that each well needs to be in the detection field for an extended period of time (e.g., tens of minutes). In addition, most currently-available plate readers have been designed for 96-well plates. Although some can be adapted for, e.g., 384-well plates, the adaptation does not result in any significant increase in throughput, since a 384-well plate going through a modified 96-well reader typically takes four times as long to read as a 96-well plate.

Another technique that has been applied to the detection of light from multiwell plates is imaging. Prior art imaging systems typically comprise a standard 50–55 mm f1.4 photographic lens coupled to a camera. While such systems can be used to image an entire multiwell plate, and theoretically provide resolution of discrete light points within individual wells, they have poor sensitivity, even when coupled to efficient cameras, so that many assays still require imaging times of tens of minutes or more. Other assays, such as SPA bead-based assays, cannot be performed at all due to lack of sensitivity. Further, images acquired with such systems suffer from vignetting and lateral distortion effects, making it difficult or impossible to compare signals from center portions of the plate with signals from lateral wells.

The present invention provides lenses and systems which overcome the above-described disadvantages of prior art methods of light detection in multiwell plates. In particular, the present invention provides, for the first time, a doubly telecentric lens-based system with the ability to image SPA bead-based assays The telecentric lens of the invention is economical to manufacture due to a design employing a minimal total number of lens elements, the use of spherical lens elements, and generous tolerance limits in lens fabrication. Further, the telecentric lens of the present invention is the first such lens to provide an unprocessed image of a multiwell plate that is substantially free from vignetting, chromatic aberration and distortion.

SUMMARY OF THE INVENTION

In one aspect, the present invention includes a multiple element doubly telecentric lens for imaging a substantially flat object onto an image plane. The lens is preferably color-corrected, particularly in the range of 400 nm–700 nm, and comprises, in succession from a side of incident light, the following lens elements or groups (illustrated in FIGS. 2 and 3): (i) a biconvex field lens element L1, (ii) separated by a distance D from the field lens element, a positive meniscus lens element L2, concave toward the incident light side, (iii) a double-Gauss lens element group, (iv) a positive meniscus lens element L10, convex toward the incident light, (v) a positive meniscus lens element L11, convex toward the incident light, and (vi) a piano concave field flattener lens element L12, concave toward the incident light side. Changing distance D changes magnification of the telecentric lens.

In a preferred embodiment, the double-Gauss lens element group comprises, in succession from the side of incident light, (i) an incident-side lens element group, comprising, in succession from the side of incident light, (a) a biconvex lens element L3, (b) a positive meniscus lens element L4, convex toward the incident light, and (c) a doublet formed of two positive meniscus lens elements, L5 and L6, both convex toward the incident light; (ii) an aperture stop; and (iii) an image-side lens element group, comprising, in succession from the side of incident light, (a) a doublet formed of a biconcave lens element L7 and a biconvex lens element L8, the doublet being concave toward the incident light, and (b) a biconvex lens element.

The adjacent surfaces of the above-listed lens elements are preferably separated by distances as follows: between about 11.4" and about 13.4" between element L1 and element L2; about 3.9" between element L2 and element L3; about 0.3" between element L3 and element L4; about 0.04" between element L4 and element L5; about 0.0" between element L5 and element L6; about 2.3" between element L6 and element L7; about 0.0" between element L7 and element L8; about 0.1" between element L8 and element L9; about 0.1" between element L9 and element L10; about 0.1" between element L10 and element L11; and about 0.3" between element L11 and element L12.

Further, the lens described above preferably has the following characteristics, where elements L1–L12 are made of glass and have surfaces S1–S24; each of the surfaces is convex (CX), concave (CC) or Plano (XX); and the CX and CC surfaces have a radius measured in inches:

| Element | Glass | Surface | Radius | CX/CC |
|---|---|---|---|---|
| L1 | Schott BK7 | S1 | 30.008" | CX |
|  | (No. 517642) | S2 | 62.327" | CX |
| L2 | Schott BK7 | S3 | 88.185" | CC |
|  | (No. 517642) | S4 | 18.483" | CX |
| L3 | Schott LaKN22 | S5 | 28.992" | CX |
|  | (No. 651559) | S6 | 19.682" | CX |
| L4 | Schott LaKN22 | S7 | 6.938" | CX |
|  | (No. 651559) | S8 | 26.500" | CC |
| L5 | Schott LaFN28 | S9 | 2.644" | CX |
|  | (No. 773496) | S10 | 3.024" | CC |
| L6 | Ohara PBH53 | S11 | 3.024" | CX |
|  | (No. 847239) | S12 | 1.564" | CC |
| L7 | Ohara PBH53 | S13 | 1.836" | CC |
|  | (No. 847239) | S14 | 14.212" | CC |
| L8 | Schott LaFN28 | S15 | 14.212" | CX |
|  | (No. 773496) | S16 | 2.776" | CX |
| L9 | Ohara LAL14 | S17 | 6.589" | CX |
|  | (No. 697555) | S18 | 3.284" | CX |
| L10 | Ohara LAL14 | S19 | 2.798" | CX |
|  | (No. 697555) | S20 | 10.465" | CC |
| L11 | Schott BK7 | S21 | 5.195" | CX |
|  | (No. 517642) | S22 | 7.752" | CC |
| L12 | Ohara LAH53 | S23 | 7.236" | CC |
|  | (No. 806410) | S24 | PLANO | XX |

In another embodiment, the telecentric lens is designed to form a focused image at the image plane when the field lens element (L1) is positioned between about 20 mm and about 30 mm, preferably about 25 mm from the object. In other embodiments, distance D is preferably between about 11.4" and about 13.4"; the lens has a numerical aperture of between about 0.5 and 0.6, preferably about 0.55; the lens has a magnification of between about −0.20 and −0.25, preferably about −0.224; and the lens has a field of view of between about 4" and about 6", preferably about 5" in diameter.

In another aspect, the invention includes a multiple element telecentric lens for imaging a multiwell plate having square wells onto a CCD pixel array. The lens has a magnification that results in each well of the plate mapping to an integer number of pixels in the CCD array. In one embodiment, the CCD array is a 1024×1024 array. In a related embodiment, the multiwell plate has dimensions of a standard multiwell plate with a 2:3 aspect ratio of rows:columns, and all wells in a single row are imaged onto a rectangular region of the 1024×1024 CCD array, the region being 1008 pixels in length. In another embodiment, the multiwell plate is selected from the group consisting of a 384-well plate, an 864-well plate, and a 1536-well plate.

Still another aspect of the invention includes a multiple element doubly telecentric lens for imaging a substantially flat object onto an image plane. The lens is preferably color corrected and has the following characteristics: (i) between 12 and 16 lens elements, preferably 12; (ii) a numerical aperture of between about 0.5 and 0.6, preferably 0.55; (iii) less than about 5% vignetting, preferably substantially zero vignetting; (iv) less than about 0.05% distortion; (v) a magnification of between about −0.20 and about −0.25, preferably between about −0.22 and about −0.23, more preferably about −0.225; and (vi) a field of view of between about 4" and about 6", preferably about 5" in diameter.

In one embodiment, the telecentric lens is used for imaging a multiwell plate having square wells onto a CCD pixel array, and has a magnification that results in each well of the plate mapping to an integer number of pixels in the CCD array.

Also included as part of the invention is a system for imaging a plate having a plurality of wells. The system comprises: (i) a multiple element telecentric lens suitable for imaging multiwell plates (e.g., as described above), (ii) a camera operably connected to the lens, and (iii) a robot having a base member and at least one arm, wherein the arm includes a grasping mechanism which is adapted to grasp the plate, and wherein the grasping mechanism is configured to receive the plate in a repeatable and known location such that the location of each well relative to the grasping mechanism is known by the robot.

In a related aspect, the invention includes a system for imaging a standard sample plate. The system includes a multiple element doubly telecentric lens as described above, a camera operably connected to the lens, and a chamber for receiving the plate during imaging. In one embodiment, the camera is a cooled 1024×1024 CCD array camera. In another embodiment, the telecentric lens and the camera are mounted on a slide support such that magnification of the lens and focus of the camera can be adjusted separately.

In yet another embodiment, the system further comprises a means for positioning the plate in the chamber, such as a robot, conveyer belt, or the like. A system using a robot preferably further comprises a plurality of stations at known locations relative to the robot, and further includes a processor associated with the robot, where the processor is configured to control movement of the robot to place the plate at predetermined locations at the stations. The standard sample plate preferably has having a plurality of wells, the robot preferably has a base member and at least one arm, the arm preferably includes a grasping mechanism which is adapted to grasp the plate, and the grasping mechanism is preferably configured to receive the plate in a repeatable and known location such that the location of each well relative to the grasping mechanism is known by the robot.

In still another embodiment, the system further comprises a translation mechanism for axially translating the frame member, wherein the grasping mechanism comprises a frame member having edges which are adapted to frame at least a portion of a periphery of the plate in a repeatable and predictable manner so that the location of the wells of the plate relative to the frame member is known when the plate is received into the frame member; and a clamping arm that is pivotally attached to the frame member and which is adapted to engage a portion of the periphery of the plate to secure the plate to the frame member when the plate is received within the frame member.

The invention further includes a method for imaging a multiwell plate. The method comprises the steps of (i) positioning the plate under a multiple element doubly telecentric lens such as is described above, (ii) collecting light from the plate with the telecentric lens, (iii) transmitting the light through the lens to an image detection device, and (iv) using output from the image detection device to generate an image of the multiwell plate. In one embodiment, the image detection device is a CCD camera.

Also part of the invention is a method for imaging a solid-phase scintillant used in a scintillation proximity assay (SPA) in a standard multiwell plate. The method includes the steps of (i) positioning the plate under a multiple element telecentric lens suitable for imaging the multiwell plate, for example, a lens such as is described above, (ii) collecting light from the plate with the telecentric lens, (iii) transmitting the light through the lens to an image detection device, and (iv) using output from the image detection device to generate an image of the multiwell plate. In one embodiment, the image detection device is a (preferably cooled) CCD camera.

These and other objects and features of the invention will become more fully apparent when the following detailed description is read in conjunction with the accompanying drawings.

DETAILED DESCRIPTION OF THE SPECIFIC EMBODIMENTS

I. Definitions

Figure 1B:
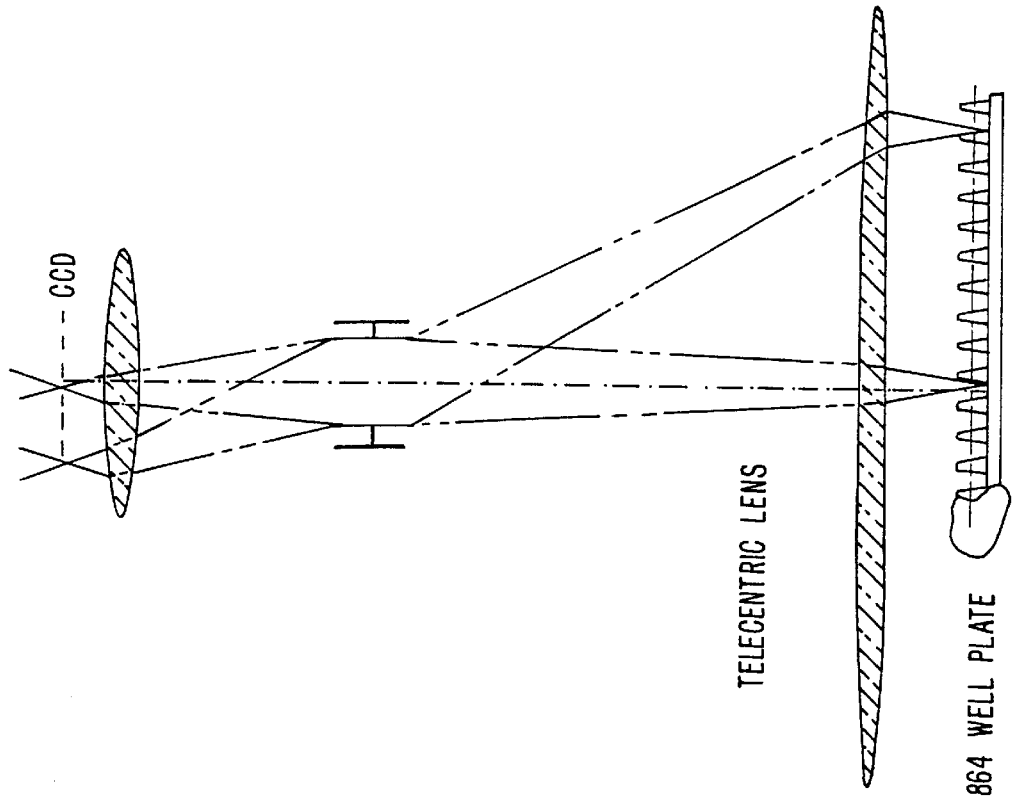
FIGS. 1A and 1B are cross-section schematic diagrams of light rays from wells of a multiwell plate passing through a non-telecentric lens (FIG. 1A) and a telecentric lens (FIG. 1B) to a CCD camera.

Unless otherwise specified, terms relating to optics are understood to have the meanings accorded to them by those of skill in the art of optics or photonics. Such meanings can be found, for example, in the "Photonics Dictionary", $40^{th}$ International Edition, Laurin Publishing Co., Pittsfield, Mass. (1994); and/or in the "Handbook of Optics, $2^{nd}$ Ed.", M. Bass, Ed., McGraw-Hill, Inc., 1995, both of which are herein incorporated by reference.

The term "lens element" refers to a simple lens formed of a single piece of optical glass.

The term "optical element" refers to an object which modifies a characteristic of light going along an optical path when the optical element is placed in that optical path. Examples of optical elements include lens elements, filters, polarizers, diffraction gratings, lens stops, shutters and the like.

The terms "compound lens" and "multiple element lens" refer to a lens composed of a plurality of lens elements that may or may not be cemented together.

A "standard multiwell plate" is a multiwell plate that is between about 4.5" and about 5.5" in length at its longest point, and between about 3" and about 3.75" in width at its widest point. The dimensions of an exemplary standard multiwell plate are about 5" in length and about 3.38" in width. Standard multiwell plates can have any number of wells. A commonly-used multiwell plate has 96 wells in an 8×12 format at ~9 mm centers. Other multiwell formats suitable for use with the present invention include, but are not limited to, 384, 864, 1536-well formats. Standard multiwell plates have a 2:3 aspect ration of rows:columns, so that, e.g., an 864-well plate has 864 wells arranged in 24 rows and 36 columns. An exemplary standard 864 well plate which may be used with the invention is described in co-pending U.S. application Ser. No. 08/868,689, filed Jun. 4, 1997, the disclosure of which is herein incorporated by reference.

A "standard sample plate" has the dimensions and characteristics of a standard multiwell plate as defined above, except that the definition encompasses multiwell plates as well as plates having only a single well (e.g., "omni plates").

II. Overview of Invention

The present invention describes an imaging system suitable for resolving points separated by about 140 $\mu$m or more. The system is particularly suitable for accurately measuring the light from discrete regions separated by physical barriers, where the barriers around a particular region limit the view of that region from points other than those directly above the region. In a preferred embodiment, the system has an optical field with a diameter of between about 4 and about 6 inches (preferably about 5 inches) In one particular embodiment, described in detail below, the system is optimized for the imaging of optical signals from wells of multiwell plates, particularly high-density multiwell plates such as 384-well, 864-well or 1536-well plates. In an exemplary embodiment,-the system is constructed around a doubly telecentric color corrected lens having a field of view wide enough to image all the wells of a standard multiwell plate onto an image capture device, such as a charge coupled device (CCD) array of a CCD camera. Experiments conducted in support of the present invention demonstrate that a lens constructed as detailed herein is at least about 7 times more sensitive than a standard non-telecentric single lens reflex (SLR) 50 mm f1.4 camera lens connected to the same CCD camera. As such, a lens of the invention can be used to reduce the time for a light-detection assays (e.g., a luminescence assay) by a factor of at least 7. Alternatively or in addition, the lens can be used to conduct experiments with smaller amounts of reagents (producing lower levels of light) than was previously possible.

The increased sensitivity is made possible by a high numerical aperture (0.55) and by a design that uses only 12 lens elements (24 surfaces). The high NA allows for the collection of a wide cone of light from the object, while limiting the number of optical elements limits light loss due to reflection at each surface (even a multilayer coated surface typically reflects approximately 0.5% to 1% of the incident light).

Figure 1A:
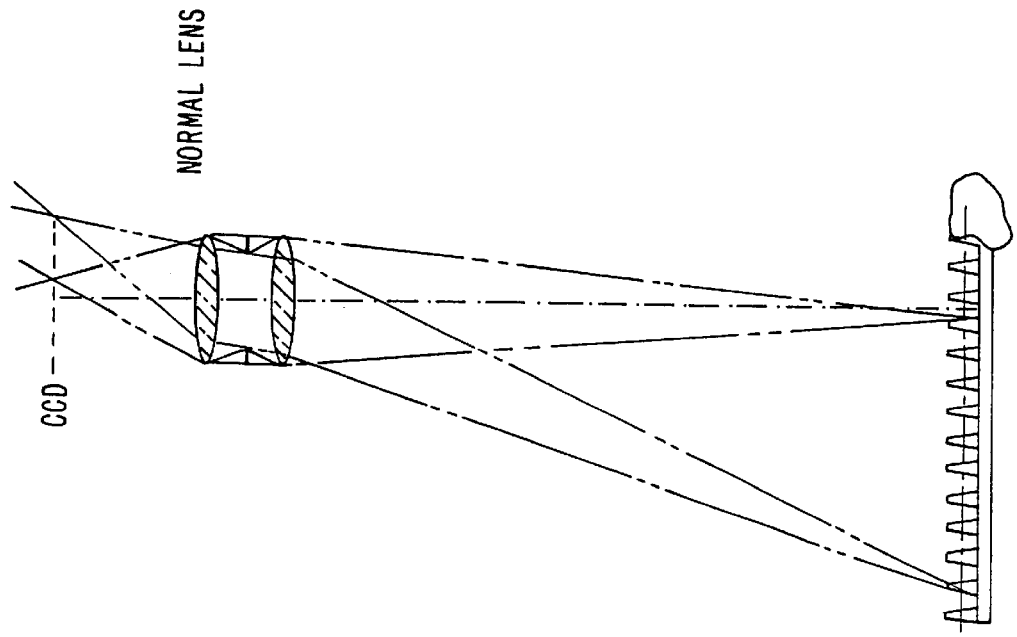

Some advantages of a telecentric lens are apparent in the schematic illustrations of FIGS. 1A and 1B. In multiwell plates with well walls separating individual wells, light coming from each well is partially blocked by the walls of that well. If all the light is effectively gathered at a single central point above the plate, as is done using a standard non-telecentric lens (FIG. 1A), the central wells will be imaged more efficiently than the wells near the sides of the plate, in part because some of the light from the side wells will be blocked by the "inner" walls of the wells (those walls closest to the center of the plate), and in part because the detection field is not centered about the perpendicular ray coming from the center of the side well. This results in a "shadowing" effect caused solely by not using a telecentric imaging system, generating an image where wells in the center appear brighter than those at the edges of the plate, even though all wells emit the same amount of light. By using a telecentric lens having a field lens or lens element of a diameter that encompasses the entire multiwell plate (FIG. 1B), such shadowing effects are eliminated.

A recognized benefit of telecentric lenses is that out-of-focus images have the same magnification as in-focus images. This characteristic has led to wide use of telecentric lenses in applications requiring precise measurements, with no tolerance for changes in magnification of out-of-focus images. In the present invention, uniform magnification of out-of-focus images is important in reducing cross-talk between adjacent wells (mistakenly attributing the light originating from one well to a neighboring well). Cross talk results, for example, when an assay is designed to detect luminescence in bulk solution, and the wells of the assay plate each contain enough solution so that the solution surface and the well bottom are in different focal planes. The out-of-focus light signals detected with a non-telecentric lens in such situations can obscure the walls of the wells (i.e., well boundaries) in an image of the plate, making quantification of signal in different wells difficult or impossible.

Full realization of the above advantages requires the use of a doubly telecentric lens—that is, a lens that is telecentric at both the object and image planes. On the object side, telecentricity provides for uniform pick up of light from the wells over the entire field, i.e., each well is seen identically. On the image side, the telecentricity serves two purposes: one is to get the high aperture (e.g., NA 0.55) cone of light into the CCD array without vignetting, and the other is to allow the image position on the CCD to remain constant even though parts of the image are defocused as a result of imaging different depths in the wells as described above.

An aspect of double telecentricity is that the magnification is not adjustable by moving the whole lens and image plane with respect to the object. For this reason, a preferred embodiment of the telecentric lens of the invention employs an object field lens (element L1 as described below) that remains fixed relative to the object, while the remainder of the lens moves during changes in magnification. Changes in focus are accomplished by moving the camera or detection device relative to the image plane of the lens, rather than changing the position of lens elements relative to the object plane or relative to one another. Since the lens is doubly telecentric, the paraxial focal length is in principle infinite. However, an effective focal length (EFL) can be attributed to portions of the doubly telecentric lens. In a preferred embodiment, the field lens (L1) has an EFL of about 995 mm, while the remainder of the lens has an EFL of about 201 mm.

A doubly telecentric lens of the invention is preferably designed to be color-corrected and to have zero vignetting. Color correction enables the use of multiple wavelength light without loss of resolution or degradation of the image due to chromatic aberration. Elimination of vignetting enables the accurate quantification of light from different regions of the multiwell plate being imaged. An additional benefit of no vignetting combined with double telecentricity is the uniformity of illumination. Even in the absence of vignetting, there is ordinarily a brightness fall off with field known as the cosine fourth law, where the arc cosine is the angle of the chief ray in object and image space. With a doubly telecentric system, both the object and image chief rays are essentially zero, so the cosine to the fourth power is ~1.

Further, the lens preferably has a distortion of less than about 0.05%. This translates to less than a 3 µm error between the center and edges of the field at the image plane, which is about 1/10 of the resolution of a typical 1024×1024 CCD array (~28 µm per pixel), such as is used in an exemplary embodiment of an imaging system of the invention.

III. Doubly Telecentric Lens

Figure 2:
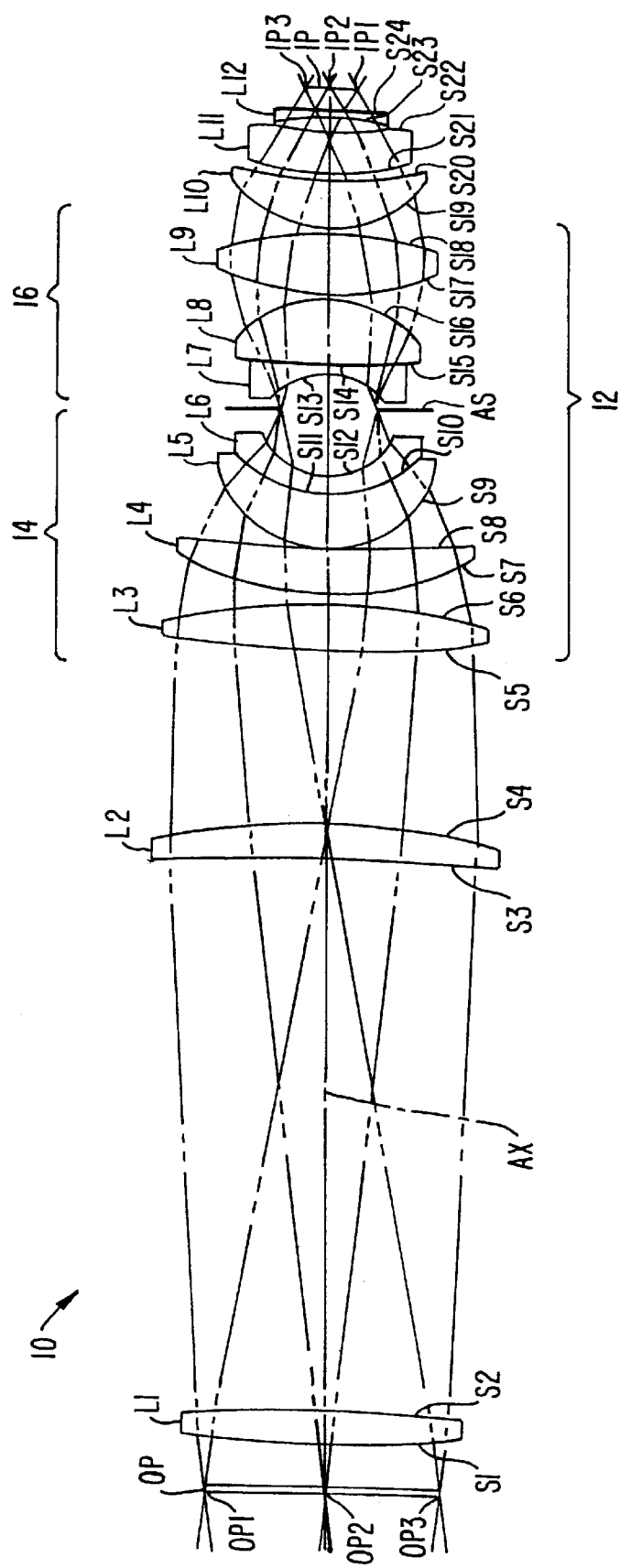
FIG. 2 is an illustration of a color-corrected doubly telecentric lens in accordance with a first embodiment of the invention.

FIG. 2 shows the optical elements of a multiple element or compound doubly telecentric lens 10 according to a preferred embodiment of the present invention. Lens 10, designed to minimize spherical (less than about 0.15%) and chromatic aberration, has a distortion of less than about 0.05%, substantially zero vignetting, a numerical aperture (NA) of 0.55, and a magnification of between about −0.20 and −0.25. Lens 10 is formed of twelve individual lens elements, L1–L12. The elements are numbered from left to right in FIGS. 2 and 3, with element L1 being adjacent object plane OP, and element L12 being adjacent image plane IP. Elements L3–L9 form a "double Gauss" lens element group 12, with elements L3-L6 forming an incident side lens element group 14, and elements L7–L9 forming an image-side lens element group 16. Each lens element has two surfaces, which are indicated for the 12 elements by S1–S24. Lens 10 is shown positioned about optical axis AX. Also shown are ray tracings starting from points OP1, OP2 and OP3 in object plane OP and continuing through lens 10 to points IP1, IP2 and IP3, respectively, in image plane IP. In between incident side lens element group 14, and image-side lens element group 16, is an aperture stop AS, positioned at the pupil of the lens.

Physical characteristics of individual lens elements used to make a preferred embodiment of the invention are provided in Table 1, below. The characteristics include the center thickness (C.T.) in inches, the outer diameter (O.D.) in inches, the type of glass, an optical characteristic number, the refractive index, and the dispersion.

TABLE 1

| Element | C.T. | O.D. | Glass | Number | ref index | disp |
|---|---|---|---|---|---|---|
| L1 | 0.7087 | 6.000 | Schott BK7 | No. 517642 | 1.517 | 64.2 |
| L2 | 0.7874 | 7.500 | Schott BK7 | No. 517642 | 1.517 | 64.2 |
| L3 | 0.9055 | 7.040 | Schott LaKN22 | No. 651559 | 1.651 | 55.9 |
| L4 | 0.9843 | 7.000 | Schott LaKN22 | No. 651559 | 1.651 | 55.9 |
| L5 | 1.2295 | 4.880 | Schott LaFN28 | No.773496 | 1.773 | 49.6 |
| L6 | 0.3232 | 4.000 | Ohara PBH53 | No. 847239 | 1.847 | 23.9 |
| L7 | 0.2232 | 4.750 | Ohara PBH53 | No. 847239 | 1.847 | 23.9 |
| L8 | 1.5071 | 3.860 | Schott LaFN28 | No. 773496 | 1.773 | 49.6 |
| L9 | 1.3032 | 4.750 | Ohara LAL14 | No. 697555 | 1.697 | 55.5 |
| L10 | 1.063 | 4.140 | Ohara LAL14 | No. 697555 | 1.697 | 55.5 |
| L11 | 0.9843 | 4.140 | Schott BK7 | No. 517642 | 1.517 | 64.2 |
| L12 | 0.1969 | 2.756 | Ohara LAH53 | No. 806410 | 1.806 | 41.0 |

Lens element L1 comprises surfaces S1 and S2, with S1 facing the object plane, lens element L2 comprises surfaces S3 and S4, and so on. Additional information, broken down by the individual surfaces of each element, is provided in Table 2, below. The information includes (i) the radius of each surface in inches; (ii) whether the surface is convex (CX), concave (CC) or PLANO (XX); and (iii) the clear aperture diameter of each surface in inches. Also shown in Table 2 are the distances (in inches) between adjacent surfaces of the individual lens elements or between lens element surfaces and the aperture stop.

TABLE 2

| Surface | Distance | Radius | CX/CC | Clear Aperture |
|---|---|---|---|---|
| S1 | | 30.008 | CX | 5.570 |
| S2 | | 62.327 | CX | 5.620 |
| | 12.413 range 11.4 to 13.4 | | | |
| S3 | | 88.185 | CC | 6.880 |
| S4 | | 18.483 | CX | 6.930 |
| | 3.877 | | | |
| S5 | | 28.992 | CX | 6.691 |
| S6 | | 19.682 | CX | 6.638 |
| | 0.320 | | | |
| S7 | | 6.938 | CX | 6.057 |
| S8 | | 26.500 | CC | 5.768 |
| | 0.039 | | | |
| S9 | | 2.644 | CX | 4.594 |
| S10 | | 3.024 | CC | 3.673 |
| | 0.000 | | | |
| S11 | | 3.024 | CX | 3.673 |
| S12 | | 1.564 | CC | 2.750 |
| | 1.538 | | | |
| Aperture Stop | | | | |
| | 0.735 | | | |
| S13 | | 1.836 | CC | 2.322 |
| S14 | | 14.212 | CC | 3.013 |
| | 0.000 | | | |
| S15 | | 14.212 | CX | 3.013 |
| S16 | | 2.776 | CX | 3.739 |
| | 0.096 | | | |
| S17 | | 6.589 | CX | 4.376 |
| S18 | | 8.284 | CX | 4.375 |
| | 0.120 | | | |
| S19 | | 2.798 | CX | 3.891 |
| S20 | | 10.465 | CC | 3.487 |
| | 0.082 | | | |
| S21 | | 5.195 | CX | 3.200 |
| S22 | | 7.752 | CC | 2.236 |
| | 0.280 | | | |
| S23 | | 7.236 | CC | 1.990 |
| S24 | | PLANO | XX | 1.820 |

In an exemplary embodiment, lens elements L1–L12 were manufactured using the glasses listed in Table 1 according to the following common specifications: The glasses used were striae grade A having a homogeneity of ±5e-6; fine annealed to </=10 nm/cm. The surface sphericity tolerance was ¼ wave at 633 nm, with a scratch & dig tolerance of 20/10. The thickness (CT) tolerance was ±0.002", and the outer diameter (OD) tolerance was +0.000", −0.0009". Centration tolerance was 5 µm TIR on all edges and flats. Doublets were cemented using "UV" cure optical cement (Summers Labs P-92) following manufacturer's instructions.

Lens elements L1–L4 and L9–L12 are all airspaced singlet elements. Elements L5 and L6 form a first doublet, and elements L7 and L8 form a second doublet. Field lens L1 is a biconvex lens positioned between about 20 mm and about 30 mm (typically about 25 mm) from the object (e.g., multiwell plate) that is being imaged. Lens element L2 is a meniscus lens element oriented concave toward the incident light side, and is spaced from lens element L1 by distance of about 11.4" to about 13.4" along optical axis AX. The purpose of element L2 is to converge the light toward aperture stop AS, with the effect of decreasing the diameter of the lens elements between L2 and aperture stop AS.

Lens elements L3–L9 form a double Gauss lens element group, or objective, centered about aperture stop AS. The double Gauss objective, also referred to as a Biotar objective, is described in U.S. Pat. No. 2,117,258, issued in 1938. In its basic form, a double Gauss lens element group employs two negative-meniscus inner doublets and two single positive outer elements. Other forms employ additional elements, as is described, for example, in Chapter 17 of "Modern Lens Design—A Resource Manual" by W. J. Smith (McGraw-Hill, Inc., New York, 1992). The exemplary embodiment described herein uses two positive outer elements (L3 and L4) on the incident light side in place of the single outer element used in the basic double Gauss design, to provide for improved distortion characteristics and correction of spherical and chromatic aberration.

Figure 3:
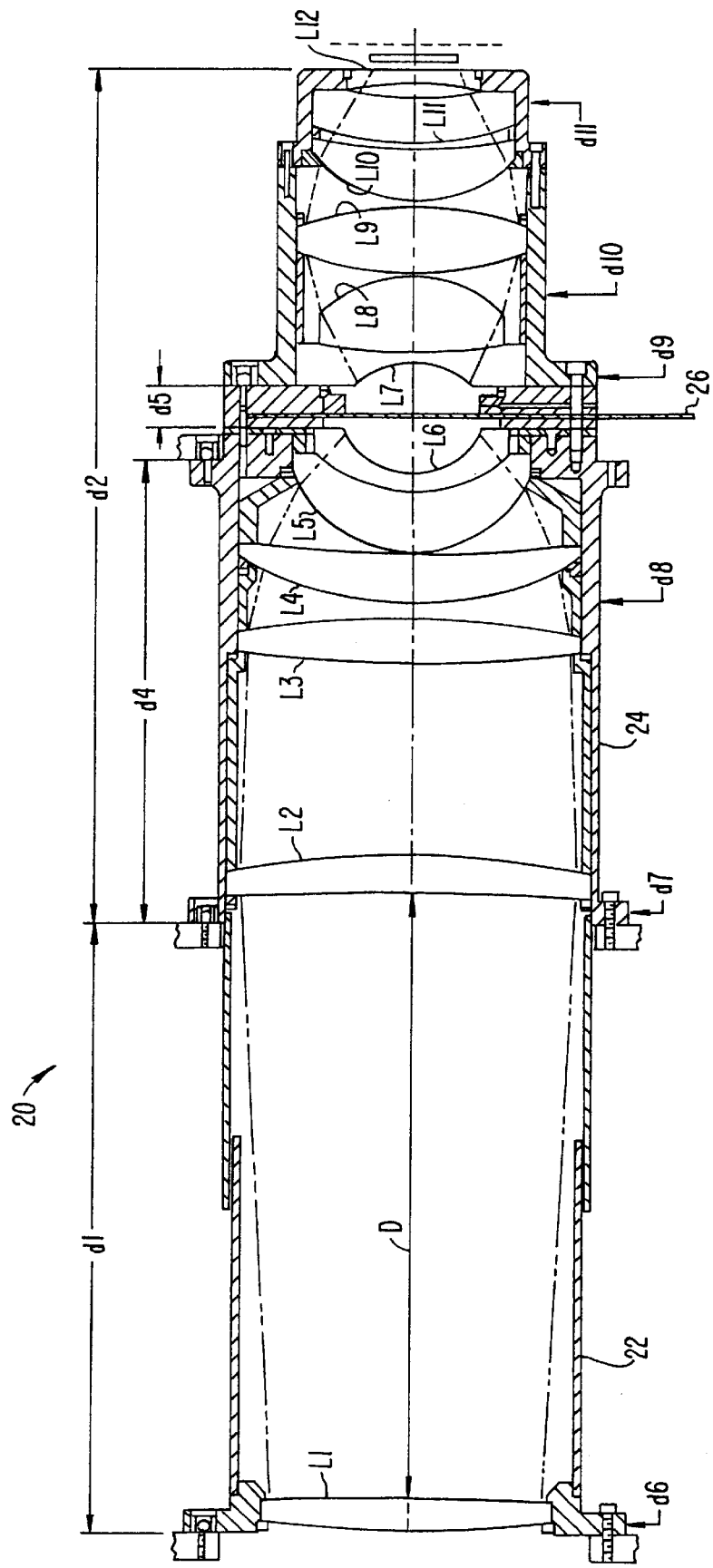
FIG. 3 is a cross-sectional view of a lens assembly containing lens elements illustrated in FIG. 2.

As seen in FIGS. 2 and 3, element L3 is a biconvex lens; element L4 is a positive meniscus lens with the convex side facing the incident light; elements L5 and L6 form a positive meniscus doublet with the convex side facing the incident light, and the concave side adjacent aperture stop AS. Elements L7 and L8 are biconcave and biconvex, respectively, which form a doublet with the concave side facing aperture stop AS and the incident light. Element L9 is a biconvex lens. Elements L10 and L11 are positive meniscus lenses with their convex sides facing the incident light. Element L12 is a negative field flattener lens for correcting residual field curvature.

The lens elements comprising telecentric lens 10 are all preferably coated with a broad band, low scatter coating optimized for 450–650 nm light: <=½% 450–650 nm, with ¼% goal emphasized for 450–550 region. An exemplary low scatter multi-layer coating with these characteristics is available from, e.g., Thin Film Labs, Milford, Pa. Since the lens preferably uses high-index glass, surfaces to be cemented in doublets are also coated before cementing to match to the lower index optical cement.

Functional characteristics of the lens include the following: The lens (i) can image all the wells of a standard multiwell plate simultaneously, i.e., has a field of view that is between about 4 and about 6 inches (preferably about 5 inches) in diameter, (ii) is color corrected over 450–650 nm (usefully corrected over 400–700 nm), (iii) has no vignetting, and (iv) can image objects within its field of view onto an area of about 1.1" in diameter. As such, the lens is optimized for imaging into a CCD camera having a CCD array on the order of about 0.75" to about 1.5" per side, preferably about 1" per side.

FIG. 3 shows lens elements L1–L12 of FIG. 2 mounted in a lens assembly 20. Lens assembly 20 includes a lower portion 22 and an upper portion 24. Lower portion 22 has a slightly smaller diameter than upper portion 24, which allows lower portion 22 to be slidably inserted into upper portion 24 in a telescoping manner, so that distance D between adjacent surfaces of L1 and L2 can be varied without admitting external light at the junction of lower portion 22 and upper portion 24. Distance D is typically varied between about 11.4" and about 13.4" to change the magnification of the lens from about −0.219 to about −0.230. When D is equal to about 12.413", the magnification is about −0.224.

In applications employing an imaging device utilizing discrete pixels for image acquisition, e.g., a CCD camera, the magnification is preferably set so that each square well in the multiwell plate is imaged onto an integer number of pixels in the imaging device ("integer pixel mapping"). In a preferred embodiment, the imaging system of the invention employs a CCD camera with a 1024×1024 array of pixels, and the magnification is set so that an entire row of wells maps to a rectangular region of the CCD array, where the region is 1008 pixels in length and one well dimension in width. This particular arrangement conveniently allows integer mapping for square-well 384, 864 and 1536-well plates having the standard 2:3 aspect ratio of rows:columns. For example, a standard 384-well plate has 16 rows and 24 columns. Setting the magnification so that an entire row (consisting of 24 adjacent wells) maps to 1008 pixels provides that each well is represented by a 42×42 pixel region in the CCD array. In the case of an 864-well plate having 24 rows and 36 columns, each well is represented by a 28×28 pixel region. Similarly, in a 1536-well plate having 36 rows and 48 columns, each well maps to a 21×21 pixel region.

Setting the magnification (by adjusting D) so that each square well in the multiwell plate is imaged onto an integer number of pixels in the imaging device as described above is advantageous in part because it aids in minimizing crosstalk between adjacent wells, and simplifies subsequent digital analysis of the image. Specifically, if integer mapping was used in the acquisition of an image of a multiwell plate, the image analysis software can be set up to automatically analyze the signal from each well by allocating an integer number of pixels per well. Further, in the case of 384 and 864-well plates, signals from groups of 4 pixels (2×2) can be "binned" in software (to reduce noise and image file size while increasing sensitivity due to an increased signal to noise ratio) without losing the advantages gained by integer pixel mapping. Such binning results in a 21×21 "superpixel" array per well for 384-well plates, and a 14×14 superpixel array per well for 864-well plates.

Dimensions of lens assembly 20 are indicated by reference characters d1–d11. An exemplary set of dimensions, suitable for making a lens assembly using lens elements dimensioned as detailed in Table 1, are presented in Table 3, below.

TABLE 3

| $d_n$ | Type | Distance |
|---|---|---|
| d1 | length | 12.57" |
|  |  | range: ~11.6"–~13.6" |
| d2 | length | 17.29" |
| d4 | length | 9.39" |
| d5 | length | 0.85" |
| d6 | diameter | 9.12" |
| d7 | diameter | 9.12" |
| d8 | diameter | 7.84" |
| d9 | diameter | 7.70" |
| d10 | diameter | 5.50" |
| d11 | diameter | 4.71" |

As illustrated in FIG. 3, a shutter 26 may be positioned between lens elements L6 and L7 at aperture stop AS (see FIG. 2) to control the amount of light passing through the lens. A shutter is desirable, for example, when a telecentric lens of the invention is used to acquire an image with a camera, e.g., a film or CCD camera, to control film or CCD exposure. Positioning the shutter at aperture stop AS (FIG. 2) is advantageous, since closing the shutter at this location in the optical path result in a gradual darkening of the entire image, as opposed to a visualization of the shutter screen moving across the image.

Figure 3A:
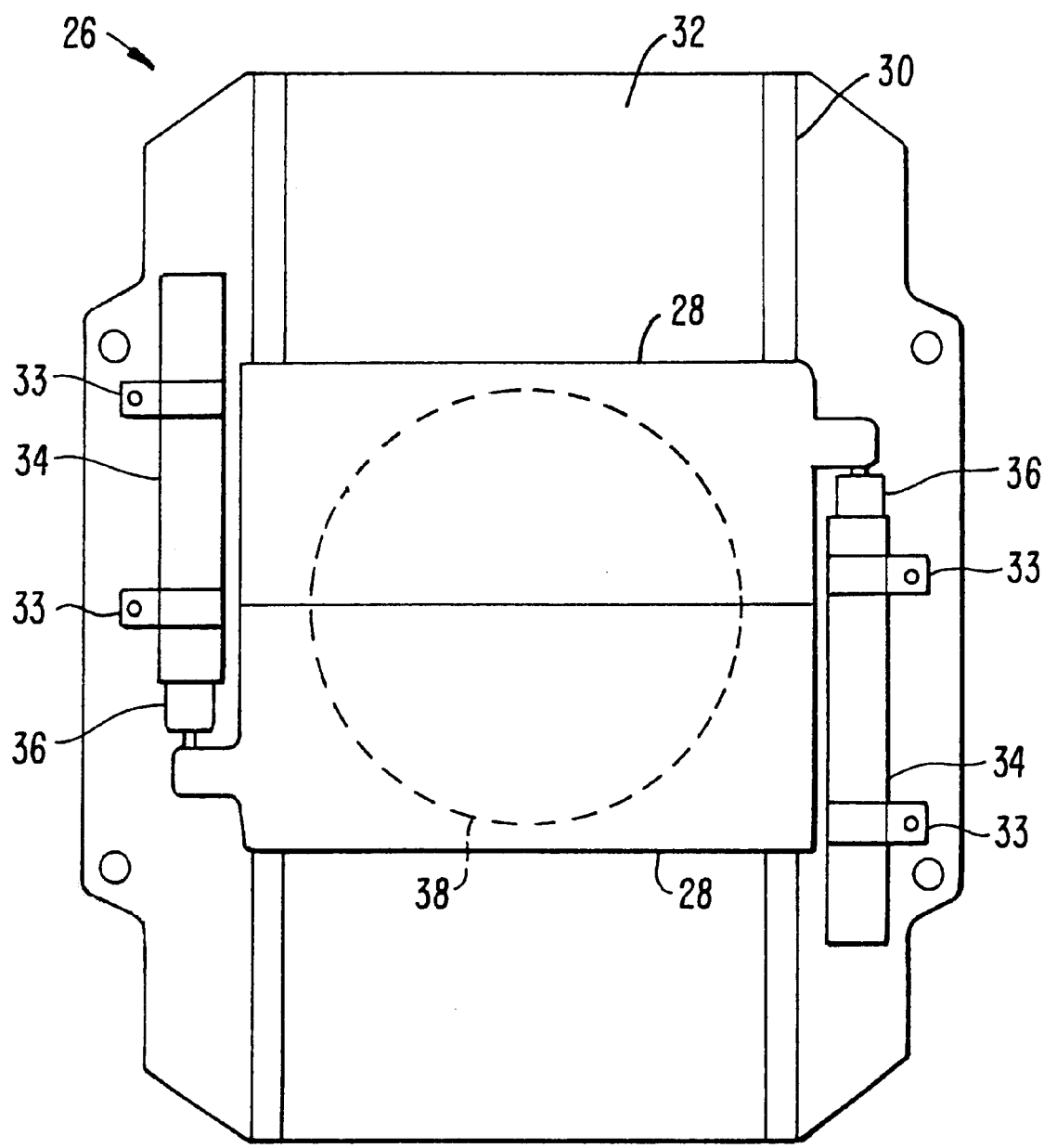
FIG. 3A is an illustration of a shutter suitable for use with the present invention.

As best seen in FIG. 3A, an exemplary shutter 26 comprises shutter leafs 28 slidably mounted on shutter guide rods 30, which in turn are fastened to shutter frame 32. Also mounted on frame 32 via attachment members 33 are air cylinders 34, each containing a piston 36. Distal ends of pistons 36 are attached to shutter leafs 28 as illustrated. When air cylinders 34 are actuated by turning on an air or gas supply (not shown), pistons 36 are pushed out of cylinders 34 and act to separate shutter leafs 28, allowing light to propagate through a hole 38 in shutter frame 32, between object plane OP and image plane IP (FIG. 2).

IV. Multiwell Plate Imaging Workstation

Figure 4:
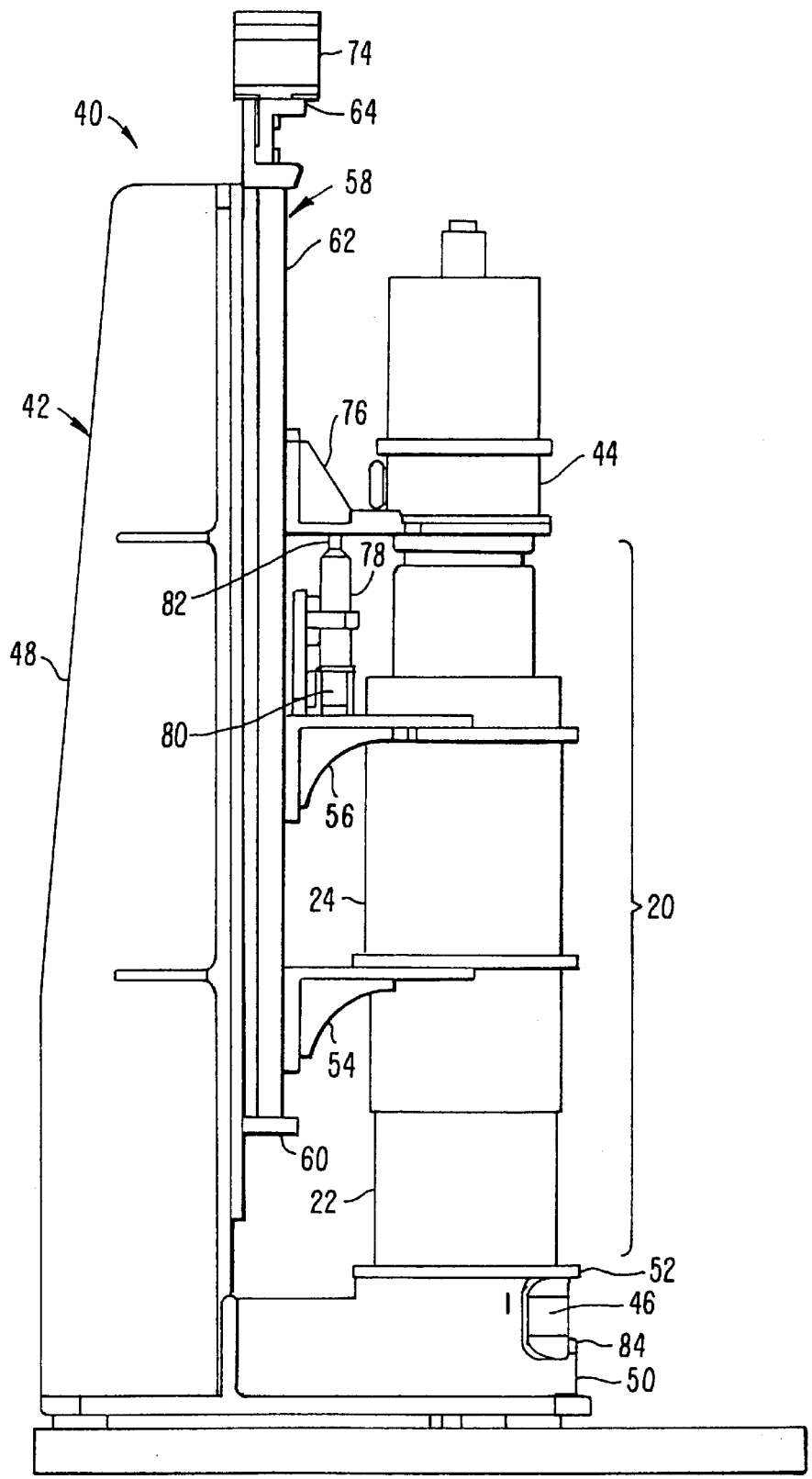
FIG. 4 is a side view of an imaging system comprising a telecentric lens of the invention mounted on a lens support.

In one aspect of the invention, the lens assembly described above is part of an imaging system for imaging multiwell plates. As best seen in FIG. 4, imaging system 40 further includes a lens support 42, a camera 44 operably connected to lens assembly 20, and a chamber 46 for enclosing the plate during imaging.

In the embodiment shown in FIG. 4, lens support 42 comprises an upright support 48 and a base 50. Lower portion 22 of lens assembly 20 is bolted or clamped to base 50 at flange 52. Upper portion 24 of lens assembly 20 is mounted to upright support 48 via two support arms, 54 and 56, which are in turn fixed to a slide 58, such as LM Guide Actuator Type KR, manufactured by THK Co., LTD (Tokyo, Japan), and available from, e.g., Bearing Engineers, Inc. (Redwood City, Calif.) as catalog number KR4610AB-940L-01600. Slide 58 is attached to upright support 48.

Figure 4A:
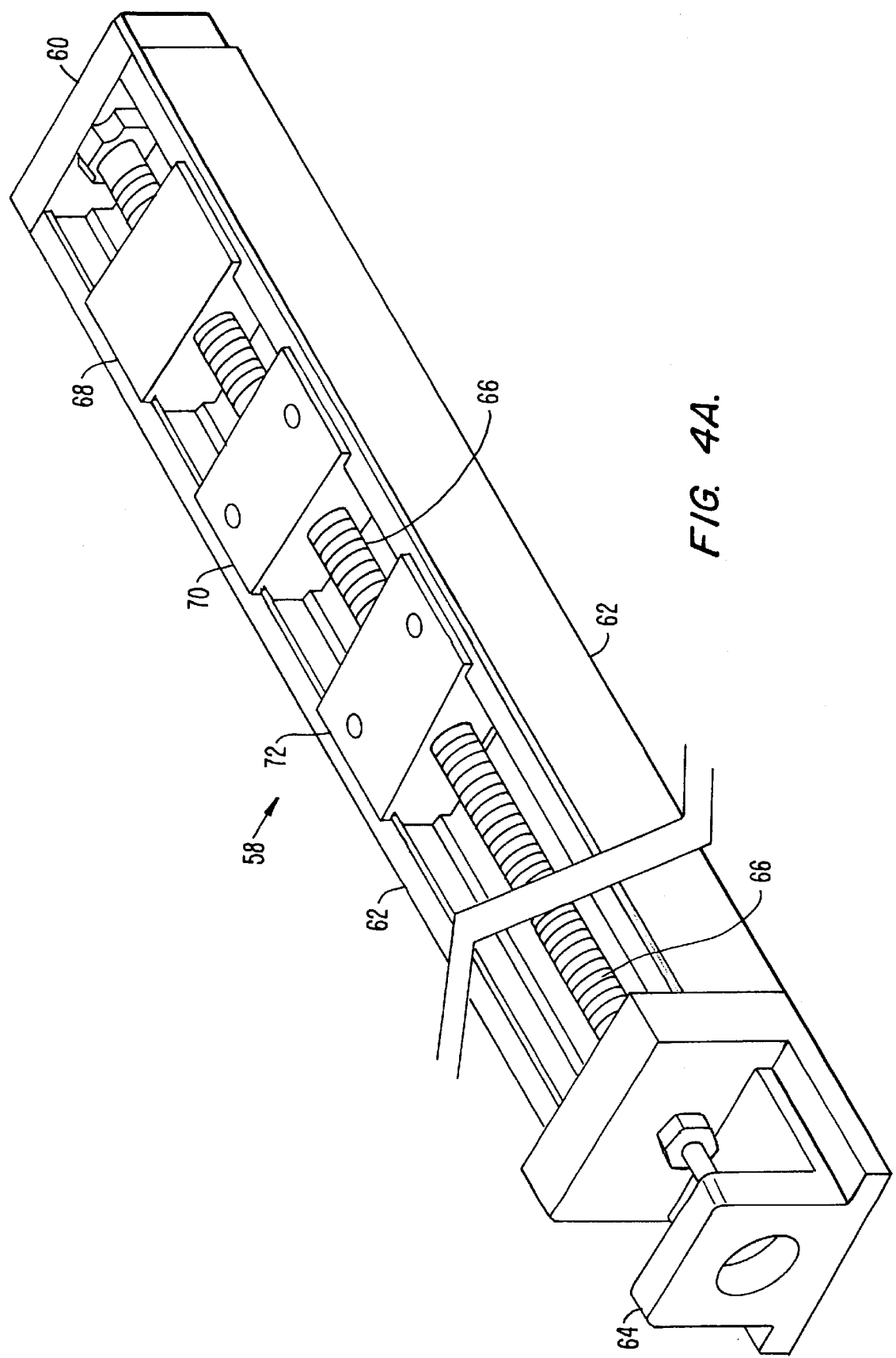
FIG. 4A is a perspective view of a slide used to attach a telecentric lens of the invention to the lens support illustrated in FIG. 4.

As best seen in FIG. 4A, slide 58 comprises a support plate 60, two rails 62, a motor mount 64, and a ball screw 66. Slide 58 further comprises three slider blocks 68, 70 and 72, which slidably engage inside walls of rails 62. Slider block 68 engages ball screw 66 so that rotation of ball screw 66 causes slider block 68 to translate along rails 62. Slider blocks 70 and 72 are designed to freely translate along rails 62 independent of any rotation of ball screw 66. Accordingly, until the slider blocks are otherwise linked together, slider block 68 is the only block that necessarily moves when ball screw 66 is rotated.

Figure 5:
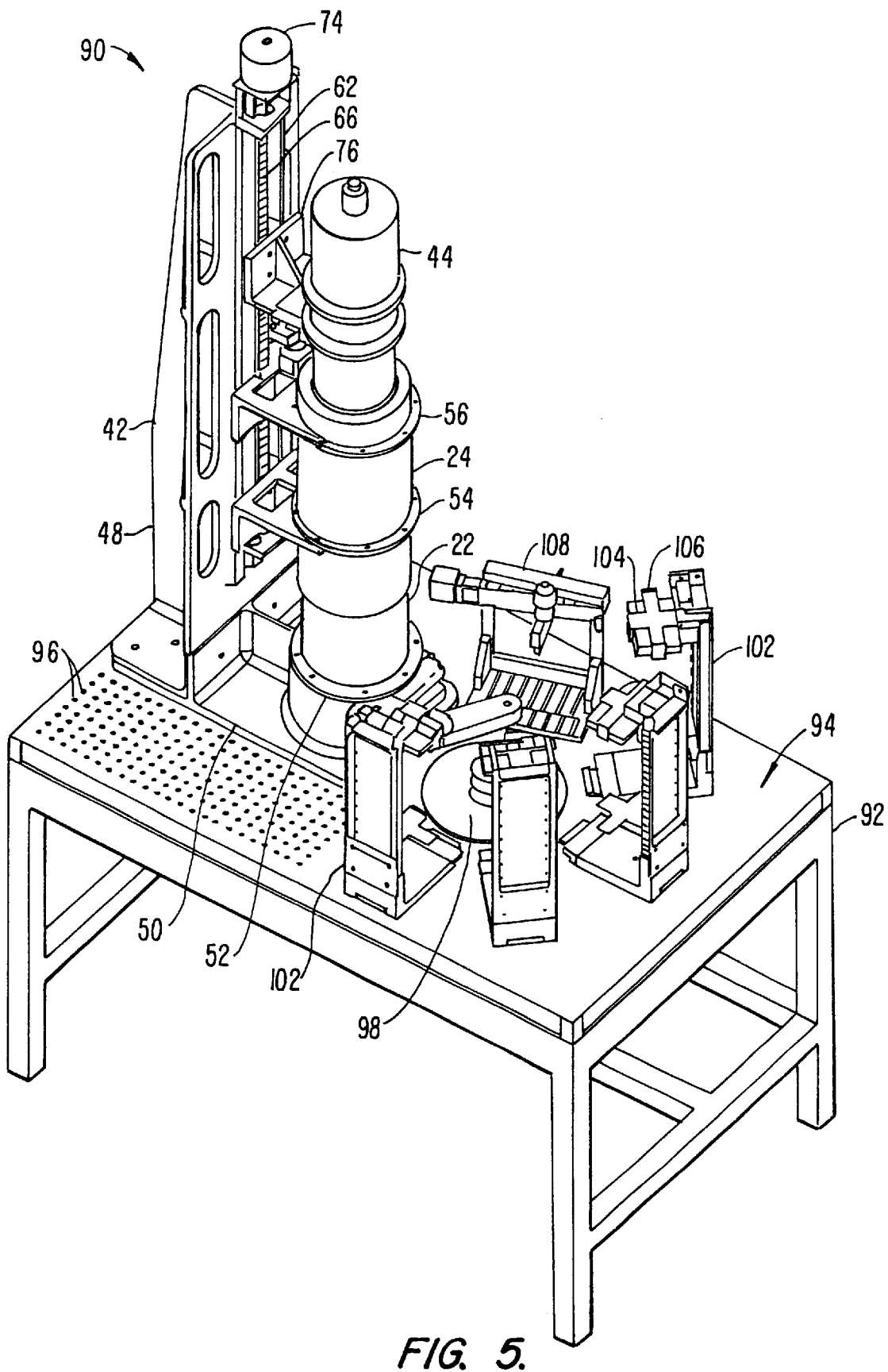
FIG. 5 is a perspective view of an imaging system comprising a robot for holding plates during imaging in accordance with the present invention.

Referring now to FIGS. 4, 4A and 5 together, it can be appreciated that support arm 54 is attached onto slider block 68, and support arm 56 is attached onto slider block 70. In this manner, when imaging system 40 is assembled as shown in FIG. 4, rotation of ball screw 66 moves upper portion 24 relative to lower portion 22 of lens assembly 20, to achieve a selected change in magnification. Support arm 56 together with slider block 70 follow passively, providing additional support for lens assembly 20. Ball screw 66 is controlled by a rotational stepper motor 74, such as Stepping Motor M2-3437-S, manufactured by Intelligent Motion Systems (Marlborough, Conn.), and available from, e.g., Bearing Engineers, Inc., Redwood City, Calif., as catalog number M2-3437-S. Activation of motor 74 turns ball screw 66 to either raise or lower upper portion 24 as described above to achieve adjustments in magnification. A power off brake (not shown), such as Model ID 1904 from Bearing Engineers, may be conveniently employed in series with motor 74 to prevent ball screw 66 from turning when stepper motor 74 is not activated. The brake can prevent both downward creep of the lens and strain on stepper motor 74 during periods when motor 74 is not activated.

Camera 44 is mounted immediately above lens assembly 20 via support arm 76 and slider block 72. The distance between camera 44 and lens assembly 20 is adjusted and maintained by a linear actuator 78 having a base 80 and a shaft 82. An exemplary linear actuator, available from Ultra Motion (Mattituck, N.Y.), is the "Bug" actuator, model number D-A.083-AB-24501-2-2-K-B. Shaft 82 moves relative to base 80 when actuator 78 is activated. Base 80 of actuator 78 is mounted to support arm 56, while shaft 82 is attached to the underside of support arm 76. In this way, activating actuator 78 to focus the camera moves support arm 76 (and thus moves camera 44) relative to support arm 56 (i.e., relative to upper portion 24 of lens assembly 20). This arrangement allows for a secure, stable mounting of the lens in a manner where the lens magnification and camera focus can be separately adjusted.

As mentioned above, imaging system 40 includes chamber 46 for enclosing the plate during imaging. The chamber may be as simple as a stage for holding the plate, or a partial enclosure into which a plate may be moved into position for imaging. In preferred embodiments, however, the chamber will act to seal out undesired extrinsic light so it is not transmitted by the lens to the camera. As shown in FIG. 4, chamber 46 is simply a cavity in support base 50 with an opening 84 for receiving a multiwell plate. Chamber 46 is light-tight, with the exception of opening 84. Typically, when a plate is imaged, opening 84 is covered with a black cloth and/or the lights in the room are turned off to seal out undesired light. Light can also be sealed out by fitting opening 84 with a light-tight door.

Camera 44 may be any suitable camera. To maximize the sensitivity of the system, however, a high-sensitivity cooled CCD is preferably employed. An exemplary cooled CCD camera is the 600 Series from Spectral Instruments (Tuscon, Ariz.) cooled with, e.g., liquid nitrogen or the "CRYOTIGER" cooling system (APD Cryogenics Inc, Allentown, Pa.). Images acquired with the CCD camera may be downloaded to a computer and analyzed with any suitable image processing software, as is well known in the art.

According to one embodiment of the invention, the imaging system further comprises a means for positioning a plate in the chamber. In a trivial example, the means is simply the operator placing a plate onto a stage under the telecentric lens. In preferred embodiments, however, such means are automated, such as a conveyer belt plate delivery system or a robot for placing the plates under the lens for imaging.

An exemplary automated imaging system is shown in FIG. 5 as reference character 90. Automated imaging system 90 is typically mounted on a support surface, such as a table 92 having a top 94 which includes a plurality holes 96 (with only a few of holes 96 being shown for convenience of illustration). The distance between each of holes 96 is known so that various pieces of equipment may be attached to top 94, with the distance between the pieces of equipment known. An exemplary table top which may be used with the invention is a TMC optical table top. Shown attached to table top 94 are lens support 42, lens assembly 20, camera 44, and a robot 98. Table top 94 may further include one or more racks 102, each of which contains a plurality of shelves 104 having raised portions 106 for holding standard sample plates, as well as a fluid dispensing station 108, and other equipment recognized by one of skill in the art as being able to facilitate plate-based automated light-detection assays.

Robot 98 is designed to place or hold multiwell plates under the telecentric lens for imaging. In a preferred embodiment, robot 98 is essentially identical to the robot described in co-owned, co-pending U.S. patent application titled "Systems and Methods for Handling and Manipulating Multi-Well Plates", Ser. No. 08/937,139, filed Sep. 24, 1997, herein incorporated by reference in its entirety.

The robot has an arm with a grasping mechanism which is configured to grasp a standard multi-well plate in a repeatable and predictable manner such that the location of the wells relative to the robot is known each time the plate is grasped. The grasping mechanism is configured such that each time a plate is grasped, it will be received at a precise location on the grasping mechanism so that the robot will know the precise location of each of the wells. Because the location of the plate relative to the robot is precisely known, the robot may be used to hold a multiwell plate in chamber 46 while an image is acquired (i.e., there is no need to place the plate on a special stage inside chamber 46).

Figure 6:
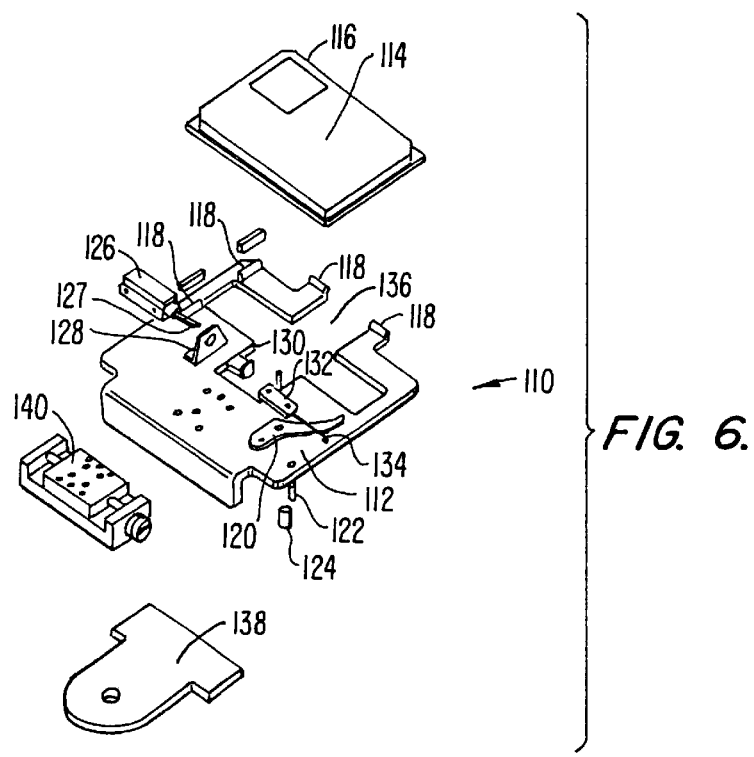
FIG. 6 is an exploded perspective view of an exemplary grasping mechanism of a robot used in one embodiment of an imaging system of the invention.
Figure 7:
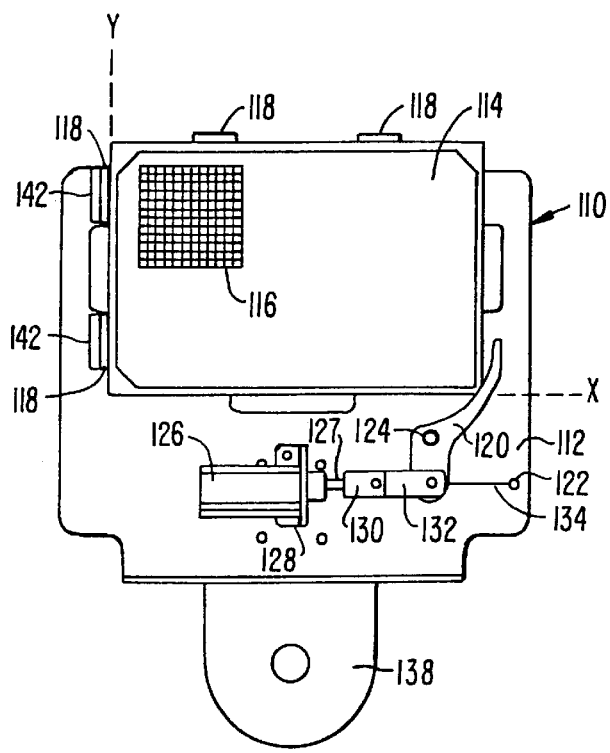
FIG. 7 is a top view of the grasping mechanism of FIG. 6.
Figure 8:
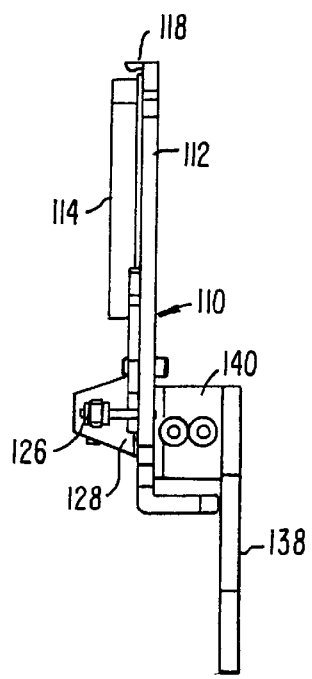
FIG. 8 is a side view of the grasping mechanism of FIG. 6.

Referring now to FIGS. 6–8, an exemplary embodiment of a grasping mechanism 110 which is useful in connection with a robot will be described. Grasping mechanism 110 comprises a frame member 112 which is configured to receive a standard sample plate or standard multi-well plate 114. Multi-well plate 114 includes a plurality of wells 116 which are arranged in a two dimensional array (for convenience of illustration, only a selected number of the wells are shown).

Frame member 112 includes four raised edges 118 which serve as stops when plate 114 is forced against them. Edges 118 are arranged such that they will engage two sides of plate 114 when plate 114 is grasped. A clamping arm 120 is pivotally attached to frame member 112 in a manner such that it may be forced against a corner of plate 114. As clamping arm 120 pushes against the corner, it forces plate 114 against edges 118 to secure plate 114 to a precise location relative to frame member 112.

Edges 118 and clamping arm 120 are inwardly tapered as they approach frame member 112. In this way, when clamping arm 120 is pivoted against the corner, plate 114 will be forced downward against frame member 112. Hence, the location of plate 114 relative to frame member 112 will be secured in the X, Y and Z directions. In this manner, grasping mechanism 110 can be used with a wide variety of standard sample plates having standard sized outer dimensions and formats since the location of each well can be repeatedly and precisely fixed relative to frame member 112.

Clamping arm 120 is pivotally attached to frame member 112 by an arm shaft 124. To pivot clamping arm 120, relative to frame member 112, an air actuated piston 126 having a rod 127 in combination with a spring 134 is employed. Piston 126 is attached to frame member 112 by a mount bracket 128, and spring 134 is attached to an arm post 122 on frame member 112. Between piston 26 and clamping arm 120 is a clevis 130 and a linkage 132. With such a configuration, spring 134 (which is in tension) causes clamping arm 120 to pivot about shaft 124 to apply a force against the corner of plate 114 as previously described. To release clamping arm 120, piston 126 is actuated to causing rod 127 to retract. In this manner, clamping arm 120 is pivoted in an opposite direction to release it from plate 114. As rod 127 of piston 126 retracts, spring 134 expands to allow clamping arm 120 to pivot.

As best shown in FIG. 6, frame member 112 includes a patterned opening 136. As described in greater detail hereinafter, patterned opening 136 is adapted to allow frame member 112 to pass over a patterned shelf when grasping plate 114.

Grasping mechanism 110 further includes an attachment member 138 which allows grasping mechanism 110 to be operably attached to a robot. Mounted to attachment member 138 is a linear translator 140 which moves frame member 112 in an axial direction. For instance, as illustrated in FIG. 7, linear translator 140 is able to move frame member 112 parallel to an X axis. In this way, once plate 114 is positioned at a piece of equipment, linear translator 140 may be employed to precisely move wells 116 into alignment with a set of dispensing tips or syringes as described in greater detail hereinafter.

Attached to two of the edges 118 is an alignment extension 142 which tapers away from the inner surfaces of edges 118. In this way, when frame member 112 is moved upward to grasp a plate, alignment extensions 142 will assist in funneling the plate into alignment with edges 118.

Figure 9A:
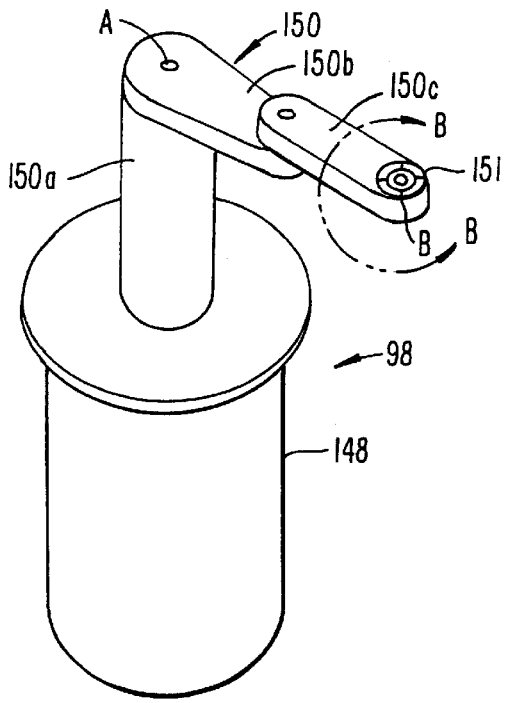
FIG. 9A is a perspective view of an exemplary robot suitable for use in an imaging system of the invention.
Figure 9B:
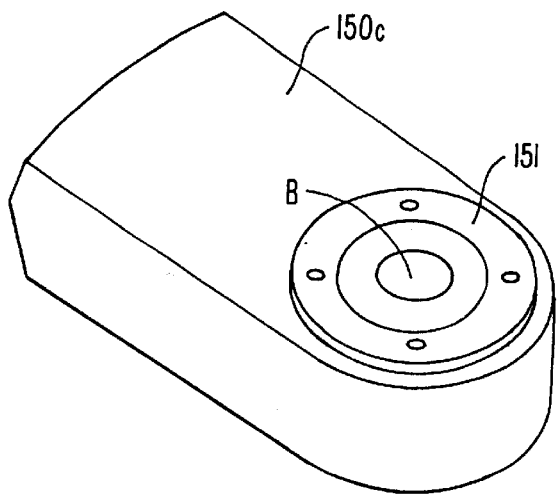
FIG. 9B is a more detailed view of the robot of FIG. 9A taken along lines B—B.

Referring now to FIGS. 9A, 9B, 10A and 10B, robot 98 will be described. Robot 98 has a base member 148 and an arm 150 Pivotally attached to arm 150 is grasping mechanism 110. As best shown in FIGS. 9A and 9B, arm 150 comprises a shaft 150a, an elbow 150b, and a linkage 150c.

Robot 98 is configured to move in a variety of directions to position plate 114 at various locations. For example, as best shown in FIGS. 9A and 9B, shaft 150a is vertically movable in an up and down motion, i.e. along a Z axis. Shaft 150a is also rotatable relative to base member 148. Elbow 150b is fixedly attached to shaft 150a and rotates with shaft 150a. Linkage 150c is pivotable relative to elbow 150b to allow a distal end of linkage 150c having a turntable 151 to move in a radial direction relative to base member 148. As previously described, frame member 112 is axially translatable relative to attachment member 138. One such robot that may be used with the invention is a ATM-205 robot, commercially available from Equipe Technologies. However, it will be appreciated that other robots may also be used. For example, the invention employ a robot where radial motion is achieved by extension and retraction of a piston.

Grasping mechanism 150 is attached to turntable 151 which is configured to maintain a Y axis of plate 114 (see FIGS. 10A and 10B) parallel to a line between points A and B on arm 150 during vertical or rotational movement of shaft 150a and/or during movement of linkage 150c. In this way, turntable 151 will rotate relative to linkage 150c during movement of arm 150 to maintain the Y axis of plate 114 at a constant orientation relative to the line between points A and B. With such a configuration, plate 114 will be properly oriented when moved to various locations surrounding robot 98.

As shown in FIG. 5, attached to top 94 are a plurality of racks 102, each of which includes a plurality of patterned shelves 104. Shelves 104 are configured to pass through patterned opening 136 of frame member 112 (see FIG. 6) and which are provided to hold multi-well plates. In this manner, robot 98 may be employed to grasp and remove a plate from one of the racks by positioning frame member 112 below one of the shelves 104 which holds a plate that is to be removed. The robot aligns patterned opening 136 with the patterned self 104 and then lifts frame member 112 vertically upward until frame member 112 lifts the plate from the shelf. As previously described, alignment extensions 142 (see FIG. 7) assist in positioning plate 114 onto frame member 112. When plate 114 rests upon frame member 112, air piston 126 (see FIG. 7) is de-pressurized causing spring 134 to force clamping arm 120 against the corner of plate 114 as previously described. In turn, this forces plate 114 against edges 118 to secure plate 114 to grasping mechanism 110. Robot 98 then moves plate 114 to another one of the racks or another piece of equipment, e.g., chamber 46, for imaging, processing, evaluation, or the like.

Figure 11:
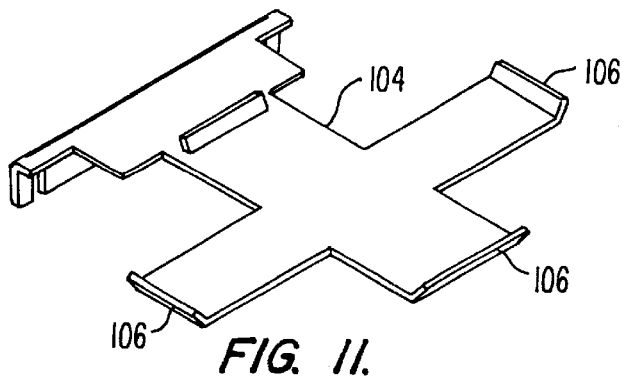
FIG. 11 is a perspective view of a patterned shelf of one of the racks of the system of FIG. 5.
Figure 10A:
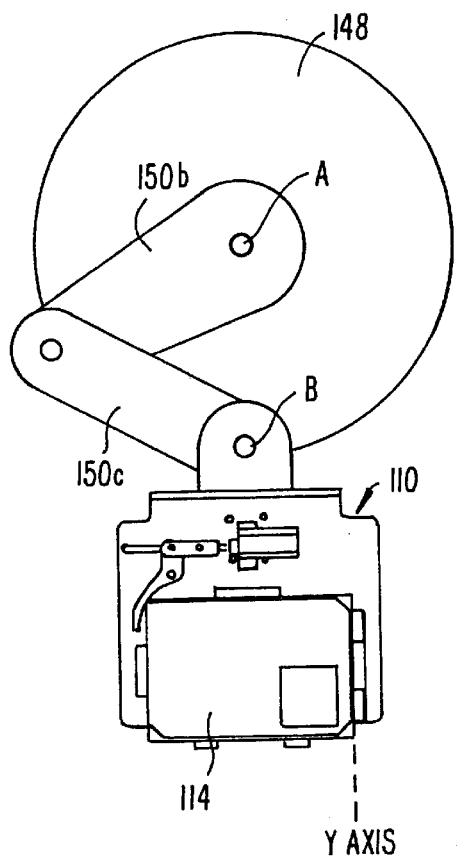
FIGS. 10A and 10B illustrate movement of the robot of FIG. 9A.
Figure 10B:
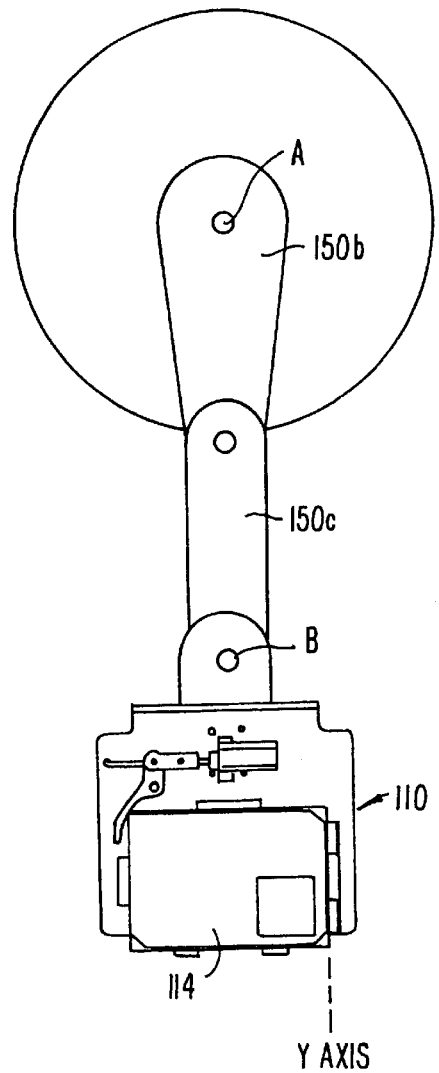

As shown in FIG. 11, raised portions 106 of shelf 104 assist in properly positioning plate 114 on the shelf. For example, when placing a plate on shelf 104, grasping mechanism 110 is lowered until shelf 104 passes through patterned opening 136. At this point raised portions 106 guide plate 114 onto shelf 104 in a desired orientation.

V. Applications

As described above, the lens and system of the invention may be used in a variety of applications to image sample plates, such as mult-iwell plates and omni plates (plates having a single "well"). One example of imaging an omni plate is in a lawn assay, where a lawn of cells, e.g., bacterial cells, is plated in a solid growth medium, and the compounds to be assayed, e.g., for activation of a luciferase reporter gene in the cells, are placed in contact with the growth medium at discrete points. Activation of the reporter is detected as a light signal from the plate at the location of the active compound.

The lens may also be used to image other substantially flat objects, such as round culture dishes, pieces of membrane or filter paper, gels, and sample arrays in other formats (e.g., arrays of immobilized polynucleotides). It can image light having wavelengths from about 350 nm to over 750 nm, but is optimized for light between about 450 nm and about 650 nm. Accordingly, suitable applications include calorimetric imaging, fluorescent imaging, luminescence imaging, phosphorescence imaging and scintillation imaging.

The high level of sensitivity afforded by the lens and system described herein allow for the imaging of extremely faint light signals, such as are generated in scintillation assays. Specifically, the present invention may be used to directly image light generated during a scintillation proximity assay (SPA; U.S. Pat. No. 4,568,649, herein incorporated by reference). SPAs are homogeneous binding assays which employ a solid phase material containing a scintillant. Examples of specific embodiments include multiwell plates manufactured to contain scintillant, and small beads ("SPA beads") or "fluoromicrospheres" containing a scintillant.

While exemplary applications are described herein with respect to beads, it will be understood that they can be conducted using other solid phase scintillants suitable for use with SPA, such as multiwell plates with incorporated scintillant. In a typical application, the beads, available from Amersham Life Science (Arlington Heights, Ill.), are derivatized (e.g., with a selected receptor) so as to bind specific molecules (e.g., ligands for the selected receptor). When a radiolabelled molecule (e.g., a radiaolabelled ligand) is bound to the bead, it stimulates the scintillant in the bead to emit light. Unbound radioactivity (e.g., unbound or free radiolabelled ligand molecules) does not produce a signal, because the radioactive energy decays before it can reach a bead to produce a scintillation event. By way of example, if the radiolabel is tritium, the decaying tritium atom releases a beta particle. In an aqueous solution, the beta particle collides with water molecules and dissipates its energy within a mean distance of about 1.5 $\mu$m. Therefore, if the beta particle is emitted within a distance of about 1.5 $\mu$m of a scintillant molecule (in an SPA bead), it result in a scintillation event. Otherwise, no light signal is detected. These principles are described in more detail by, e.g., Bosworth, N. and Towers, P., *Nature* 341:167–168 (1989) and by Udenfriend, S., et al., *Anal. Biochem.*, 161:494–500 (1987).

Because SPAs are homogeneous assays, whereby unbound labeled molecules do not need to be removed from the assay mixture prior to detection of bound molecules, they are widely used in the areas of clinical research, drug screening & discovery and pharmacology. Specific application include radioimmune assays, receptor binding assays (see, e.g., Kienhuis, C. B. M., et al., *J. Receptor Research* 12:389–399 (1992)) and enzyme assays, including signal increase and signal decrease assays. Protocols for such assays are known in the art and can be obtained from Amersham. For example, receptor binding assays can be conducted with either solubilized or membrane-bound receptors. The receptor or the membrane in which it resides is typically immobilized onto the SPA bead and an appropriate ligand is radiolabelled (generally with either $^{125}$I or $^3$H). When the tracer binds to the receptor, the radioisotope stimulates the scintillant in the bead to emit light. By contrast, if an unlabelled ligand or competing drug (as in a drug-screening assay) replaces the tracer in the receptor binding site, less radioactivity is bound to the bead, and consequently less light is emitted. The presence of molecules that are able to compete with the radiotracer for the receptor may thus be detected.

Prior to the present invention, detection of light from SPA assays in multiwell plates was typically performed using a scintillation counter, such as the "TOPCOUNT" from Packard Instrument Company (Meriden, Conn.). As detailed above, such detection methods are relatively slow and are not presently suitable for use with high-density (e.g., 864-well) multiwell plates. Accordingly, presently-available methods for quantifying light from SPAs in multiwell plates is a bottleneck in high throughput screening (HTS) applications. Example 1, below, describes how this detection process can be streamlined through the use of a telecentric lens and system of the present invention. In the example, light from a scintillation proximity receptor binding assay in an 864-well plate using the cholecystokinin B (CCKB) receptor is measured in about 10 minutes using the lens and system of the invention.

When used to detect extremely low levels of light, as with SPA imaging, it is desirable to use a very low noise camera CCD camera as the detection device. An exemplary camera suitable for such high-sensitivity, low noise detection applications is the 600 Series from Spectral Instruments. This camera can be set to have a very slow read-out to limit the readout noise to less than 8 e-per readout. To reduce the dark current, the CCD should be cooled, preferably to below about −80 degrees C. Such cooling may be accomplished using, for example, liquid nitrogen or the "CRYOTIGER" camera cooling system (APD Cryogenics, Inc). A Spectral Imaging 600-series camera in conjunction with a "CRYOTIGER" has a dark current of less than 1 electron per hour, which together with the superior light collecting properties of the telecentric lens of the invention, enable imaging of extremely faint light signals, such as are generated in SPA experiments.

The following example illustrates but in no way is intended to limit the present invention.

EXAMPLE 1

Detection of Inhibition of CCK8 Binding to CCKb Receptor Assayed by a Scintillation Proximity Assay A COS cell line expressing the human cholecystokinin B (CCKb) receptor (CCKbR) was constructed using human CCKbR cDNA substantially as described in Koller, K. J., et al., *Anal. Biochem.* 250:51–60 (1997). Membrane fragments from the CCKbR-expressing CHO cells were prepared as described by Koller, et al., and were pre-incubated with wheatgerm agglutinin-coated PVT SPA beads (Amersham). Approximately 0.25 mg of SPA beads were combined with 2 μg or 1 μg of CCKbR membrane protein for each well of a 96-well or white 864-well plate, respectively. Unbound membrane protein was removed from the beads by centrifugation (700×g, 5 min.) and the pellet (containing receptors bound to SPA beads) was resuspended in assay buffer (20 mM HEPES, 1 mM EGTA, 118 mM NaCl, 5 mM $MgCl_2$, 5 mg/ml BSA, 4.7 mM KCl) to generate an assay cocktail.

50 or 100 pM $^{125}$I-CCK8 (a highly selective non-peptide radioligand for the CCKb/gastrin receptor, available from Amersham as catalog number IM159) was added to the assay cocktail in the presence or absence of various concentrations of unlabeled CCK8 to a final volume of 100 μl for 96-well plates or 16 μl for 864-well plate. The plates were incubated at room temperature overnight to reach equilibrium. The 864-well white plate was kept in the dark to allow for decay of plate phosphorescence, which would otherwise interfere with detection of scintillation events.

Following the overnight incubations, scintillation from the plates was measured. Data from the 96-well plate were collected using the "TOPCOUNT" (Packard) following manufacturer's instructions. The 864-well plate was imaged using a double telecentric lens system of the present invention. The plate was imaged twice for 10 minutes per exposure with the Series 600 CCD camera from Spectral Imaging cooled using the "CRYOTIGER" system as described above.

The image data were analyzed using the IPLab Spectrum 3.1 program (Scanalytics, Incorporated, Fairfax, Va.). The two images were overlaid and the minimum value for each corresponding pixel was used to generate a final image (to correct for background noise due to cosmic rays). Dark noise generated by the CCD itself, corresponding to the temperature at the time the images were captured, was also subtracted.

Figure 12:
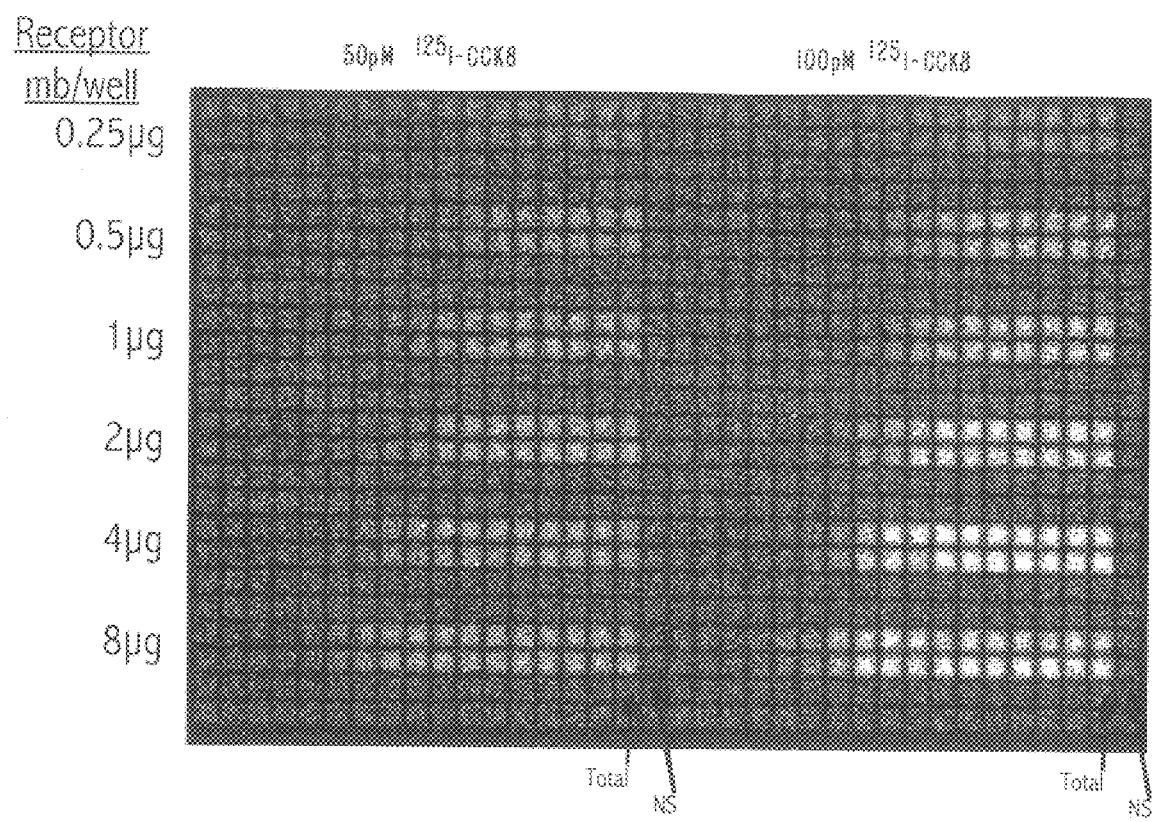
FIG. 12 is a computer-generated image of SPA bead luminescence produced using an imaging system of the invention as described in Example 1.
Figure 13:
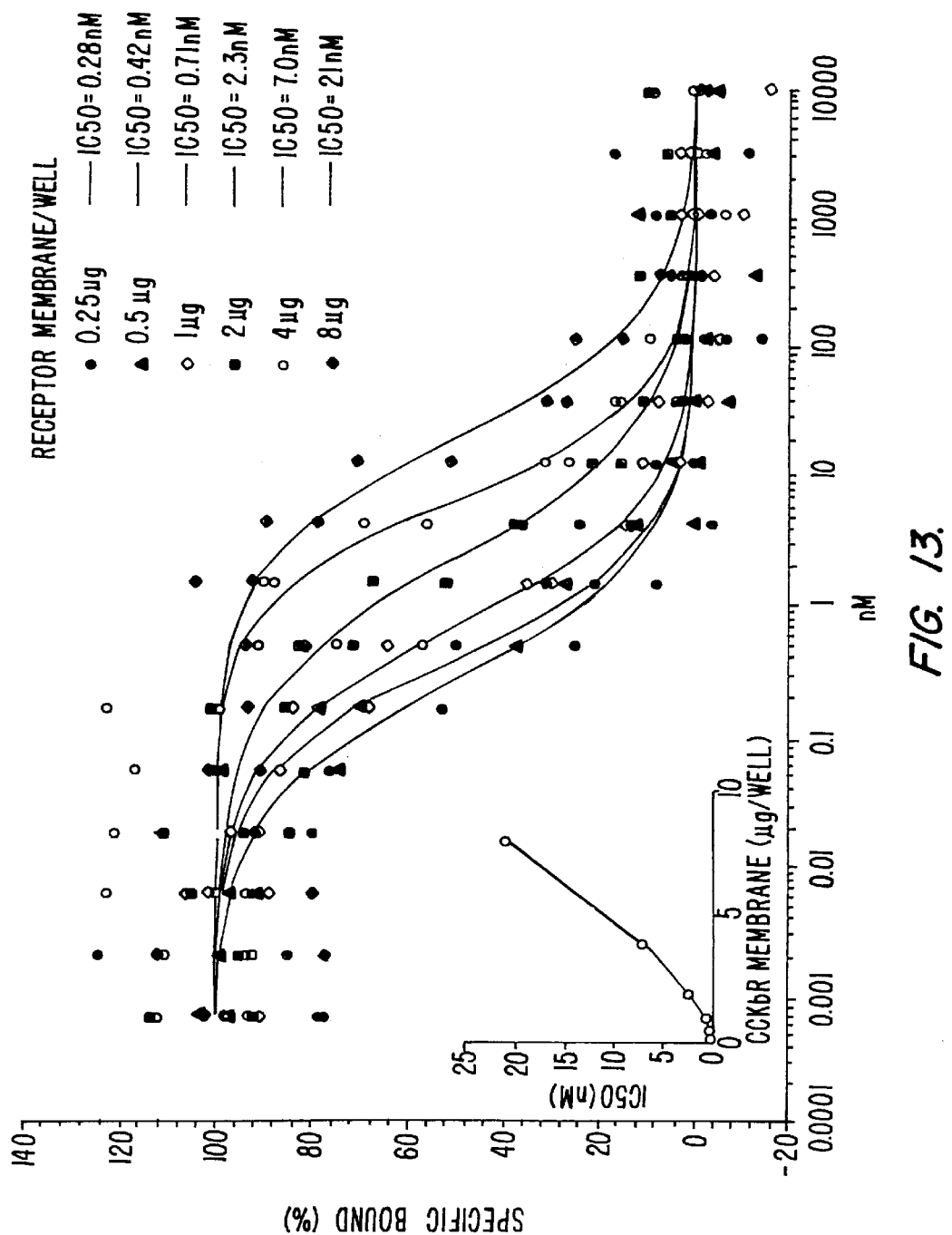
FIG. 13 shows binding inhibition curves and $IC_{50}$ values obtained from the data shown in FIG. 12.

An exemplary image generated as described above is shown in FIG. 12. The experiment was conducted with different amounts of CCKbR membrane protein (indicated along the left side) and at two different $^{125}$I-CCK8 concentrations (indicated along the top). At each CCKbR membrane protein and $^{125}$I-CCK8 concentration, the assay cocktail was incubated in duplicate with 16 different concentrations of unlabeled CCK8. These data were then used to generate binding inhibition curves, shown in FIG. 13. As can be appreciated from FIG. 13, increasing amounts of receptor resulted in a rightward shift of the inhibition curve and corresponding $IC_{50}$ values. The $IC_{50}$ values are plotted as a function of CCKbR membrane protein concentration in the inset. The data indicate that a receptor membrane concentration of about 1 μg per well is optimal for drug screening studies with CCKbR and $^{125}$I-CCK8. The inhibition curves and corresponding $IC_{50}$ values determined using the 96-well plates and "TOPCOUNT" were in accord with those determined from the images as described above. Taken together, the data demonstrate that an imaging system of the invention, using a telecentric lens of the invention, is capable of capturing image data from a bead-based SPA assay in a high-density multiwell plate in a reasonable period of time. Further, the results show that the image data are uniform across the plate, and can thus be quantitatively analyzed, e.g., to generate binding inhibition curves and corresponding $IC_{50}$ values.

While the invention has been described with reference to specific methods and embodiments, it is appreciated that various modifications and changes may be made without departing from the invention.

It is claimed:

1. A multiple element doubly telecentric lens for imaging a substantially flat object onto an image plane, said lens comprising, in succession from a side of incident light, a biconvex field lens element L1, separated by a distance D from said field lens element, a positive meniscus lens element L2, concave toward the incident light side, a double-Gauss lens element group, a positive meniscus lens element L10, convex toward the incident light, a positive meniscus lens element L11, convex toward the incident light, and a plano concave field flattener lens element L12, concave toward the incident light side, wherein changing distance D changes magnification of said telecentric lens.

2. A telecentric lens of claim 1, wherein said double-Gauss lens element group comprises, in succession from the side of incident light, (i) an incident-side lens element group, comprising, -in succession from the side of incident light, (a) a biconvex lens element L3, (b) a positive meniscus lens element L4, convex toward the incident light, and (c) a doublet formed of two positive meniscus lens elements, L5 and L6, both convex toward the incident light;

(ii) an aperture stop; and (iii) an image-side lens element group, comprising, in succession from the side of incident light, (a) a doublet formed of a biconcave lens element L7 and a biconvex lens element L8, said doublet being concave toward the incident light, and (b) a biconvex lens element.

3. A telecentric lens of claim 2, wherein adjacent surfaces of lens elements are separated by distances as follows:

between about 11.4" and about 13.4" between element L1 and element L2;

about 3.9" between element L2 and element L3;

about 0.3" between element L3 and element L4;

about 0.04" between element L4 and element L5;

about 0.0" between element L5 and element L6;

about 2.3" between element L6 and element L7;

about 0.0" between element L7 and element L8;

about 0.1" between element L8 and element L9;

about 0.1" between element L9 and element L10;

about 0.1" between element L10 and element L11; and about 0.3" between element L11 and element L12.

4. A telecentric lens of claim 3, having substantially the following characteristics:

| Element | Glass | Surface | Radius | CX/CC |
|---|---|---|---|---|
| L1 | Schott BK7 | S1 | 30.008" | CX |
|  | (No. 517642) | S2 | 62.327" | CX |
| L2 | Schott BK7 | S3 | 88.185" | CC |
|  | (No. 517642) | S4 | 18.483" | CX |
| L3 | Schott LaKN22 | S5 | 28.992" | CX |
|  | (No. 651559) | S6 | 19.682" | CX |
| L4 | Schott LaKN22 | S7 | 6.938" | CX |
|  | (No. 651559) | S8 | 26.500" | CC |
| L5 | Schott LaFN28 | S9 | 2.644" | CX |
|  | (No. 773496) | S10 | 3.024" | CC |
| L6 | Ohara PBH53 | S11 | 3.024" | CX |
|  | (No. 847239) | S12 | 1.564" | CC |
| L7 | Ohara PBH53 | S13 | 1.836" | CC |
|  | (No. 847239) | S14 | 14.212" | CC |

-continued

| Element | Glass | Surface | Radius | CX/CC |
|---|---|---|---|---|
| L8 | Schott LaFN28 | S15 | 14.212" | CX |
|  | (No. 773496) | S16 | 2.776" | CX |
| L9 | Ohara LAL14 | S17 | 6.589" | CX |
|  | (No. 697555) | S18 | 8.284" | CX |
| L10 | Ohara LAL14 | S19 | 2.798" | CX |
|  | (No. 697555) | S20 | 10.465" | CC |
| L11 | Schott BK7 | S21 | 5.195" | CX |
|  | (No. 517642) | S22 | 7.752" | CC |
| L12 | Ohara LAH53 | S23 | 7.236" | CC |
|  | (No. 806410) | S24 | PLANO | XX | wherein elements L1–L12 are made of glass and have surfaces S1–S24; each of said surfaces being convex (CX), concave (CC) or plano (XX); and said CX and CC surfaces having a radius measured in inches.

5. A telecentric lens of claim 1, wherein distance D is between about 11.4" and about 13.4".

6. A telecentric lens of claim 1, having a magnification of between about −0.20 and -0.25.

7. A telecentric lens of claim 1, having a field of view of between about 4 and about 6 inches in diameter.

8. A system for imaging a standard sample plate, said system comprising a multiple element color corrected doubly telecentric lens of claim 1, a camera operably connected to said lens, and a chamber for receiving said plate during imaging.

9. A system of claim 8, further comprising a means for positioning said plate in said chamber.

10. A method for imaging a multiwell plate, comprising positioning the plate under a multiple element doubly telecentric lens of claim 1, collecting light from said plate with said telecentric lens, transmitting said light through said lens to an image detection device, and using output from said image detection device to generate an image of said multiwell plate.

11. A method for imaging a solid-phase scintillant used in a scintillation proximity assay (SPA) in a standard multiwell plate, comprising positioning the plate under a multiple element telecentric lens suitable for imaging said multiwell plate, collecting light from said plate with said telecentric lens, transmitting said light through said lens to an image detection device, and using output from said image detection device to generate an image of said multiwell plate, wherein said lens is a doubly telecentric lens of claim 1.

* * * * *